US012530038B2

(12) United States Patent
Suzuki et al.

(10) Patent No.: US 12,530,038 B2
(45) Date of Patent: Jan. 20, 2026

(54) ROUTE CREATION METHOD, WORK VEHICLE, AND AUTONOMOUS TRAVEL SYSTEM

(71) Applicant: Yanmar Holdings Co., Ltd., Osaka (JP)

(72) Inventors: Hidetaka Suzuki, Okayama (JP); Masaaki Murayama, Okayama (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 135 days.

(21) Appl. No.: 18/387,037

(22) Filed: Nov. 5, 2023

(65) Prior Publication Data

US 2024/0184294 A1    Jun. 6, 2024

(30) Foreign Application Priority Data

Dec. 5, 2022    (JP) .................................. 2022-193943
Aug. 24, 2023   (JP) .................................. 2023-136139

(51) Int. Cl.
   *G05D 1/648*    (2024.01)
   *A01D 41/02*    (2006.01)
   *G05D 1/644*    (2024.01)

(52) U.S. Cl.
   CPC ............. *G05D 1/648* (2024.01); *A01D 41/02* (2013.01); *G05D 1/644* (2024.01)

(58) Field of Classification Search
   CPC ...... G05D 1/648; G05D 1/644; G05D 1/2246; G05D 2105/15; G05D 2107/21;
   (Continued)

(56) References Cited

U.S. PATENT DOCUMENTS

| 8,209,075 B2* | 6/2012 | Senneff ................ A01B 69/008 |
| | | 701/410 |
| 2017/0144702 A1* | 5/2017 | Dang ..................... B62D 6/001 |
| (Continued) | | |

FOREIGN PATENT DOCUMENTS

| DE | 102020109018 A1 * | 10/2021 |
| EP | 2020169 A2 | 7/2008 |
| (Continued) | | |

OTHER PUBLICATIONS

Spekken et al.; Optimized routing on agricultural fields by minimizing maneuvering and servicing time; Precision Agric (2013) 14: 224-244 DOI 10.1007/s11119-012-9290-5; Published online: Oct. 21, 2012; Springer Science+Business Media New York 2012 (Year: 2012).*

(Continued)

*Primary Examiner* — Michael J Zanelli
(74) *Attorney, Agent, or Firm* — Chris Mizumoto

(57) ABSTRACT

In a combine harvester, a terminal-side control device of a portable terminal functions as a route creation unit and a route determination unit. The route creation unit creates an autonomous travel route including a plurality of work routes for performing work in an unworked region of the field and a turning route connecting the two work routes. The route determination unit determines whether the position of the combine harvester during traveling of the combine harvester on the turning route and the position of the field outline satisfy a predetermined positional relationship with regard to the autonomous travel route, confirms the autonomous travel route when it is determined that the predetermined positional relationship is satisfied, and recreates the autonomous travel route to satisfy the predetermined positional relationship when it is determined that the predetermined positional relationship is not satisfied.

10 Claims, 14 Drawing Sheets

(58) Field of Classification Search
CPC ............. G05D 2109/10; A01D 41/02; A01D 41/1278; A01B 69/008
See application file for complete search history.

(56) References Cited

U.S. PATENT DOCUMENTS

2018/0136664 A1\* 5/2018 Tomita ................. A01B 69/008
2018/0156622 A1   6/2018 Mouthaan et al.

FOREIGN PATENT DOCUMENTS

| EP | 3549419 A1 | * | 10/2019 | ............ A01B 69/00 |
| EP | 3850932 A1 | * | 7/2021 | ........... A01B 69/008 |
| JP | 2018143216 A | * | 9/2018 | ............ A01B 69/00 |
| JP | 2019110783 A | * | 7/2019 | |
| JP | 2020113325 A | * | 7/2020 | |
| JP | 2021083387 A | * | 6/2021 | |
| KR | 20160134705 A | * | 11/2016 | |

OTHER PUBLICATIONS

Journal of Agriculture and Food Research 1 (2019)100009, Headland turning optimisation for agricultural vehicles and those with towed implements by Xuyong Tu, Lie Tang.

\* cited by examiner

FIG. 10
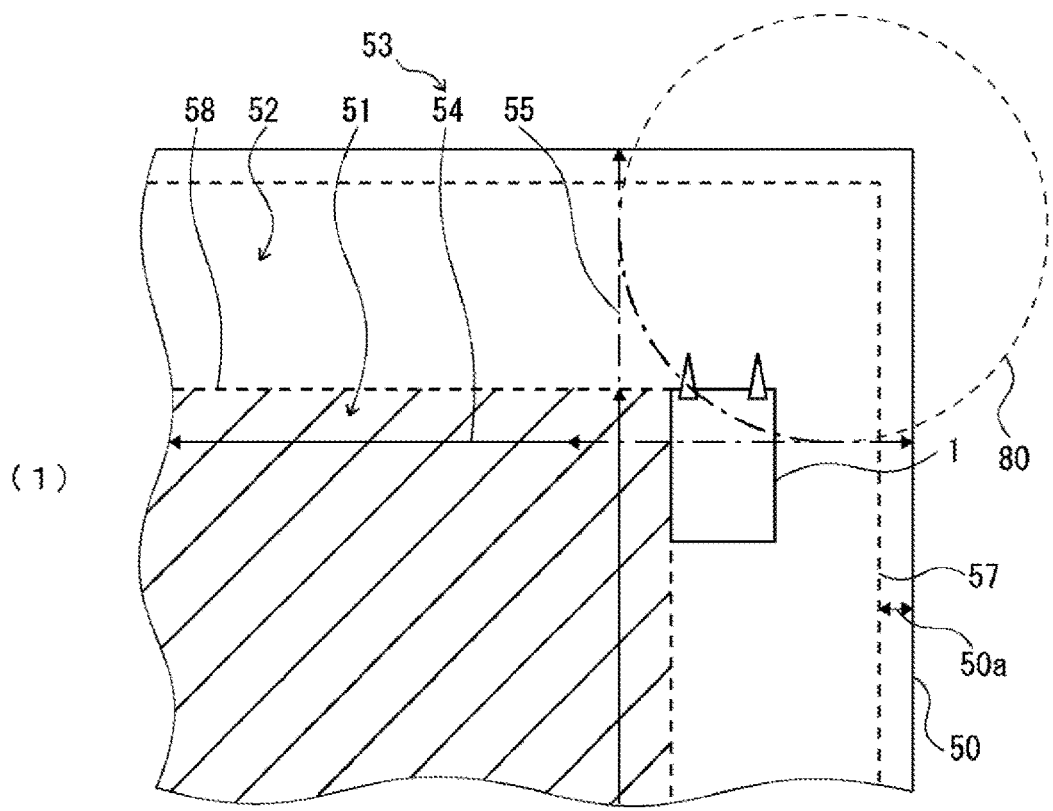
(1)
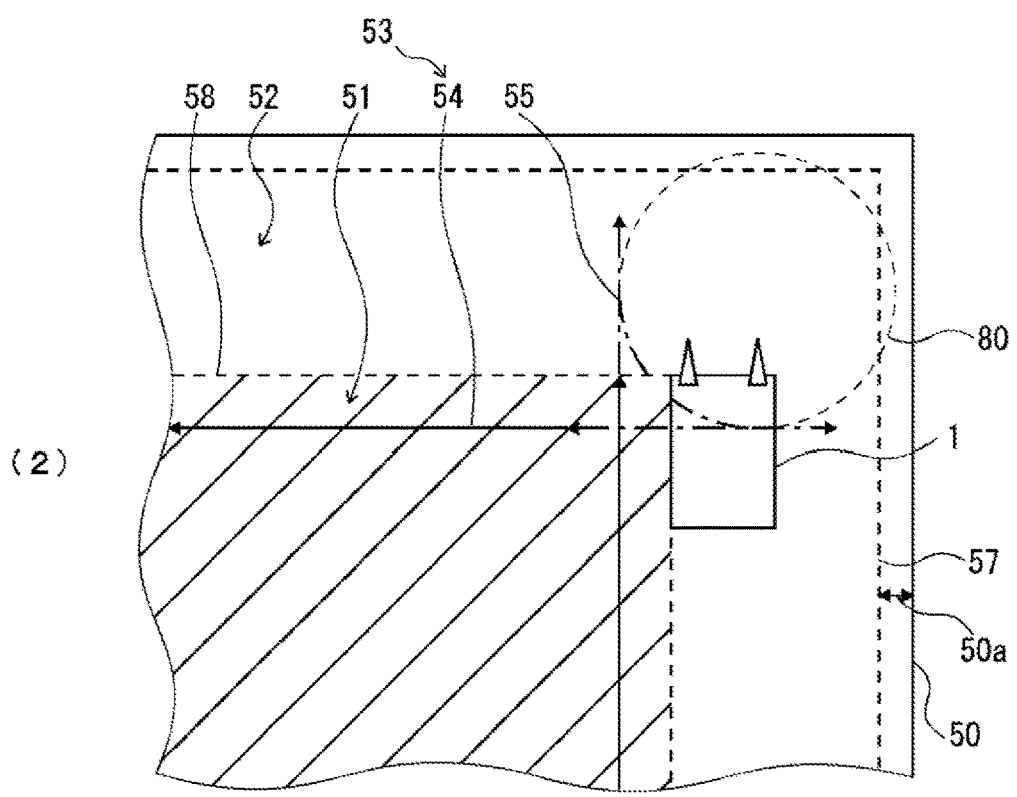
(2)

FIG. 13
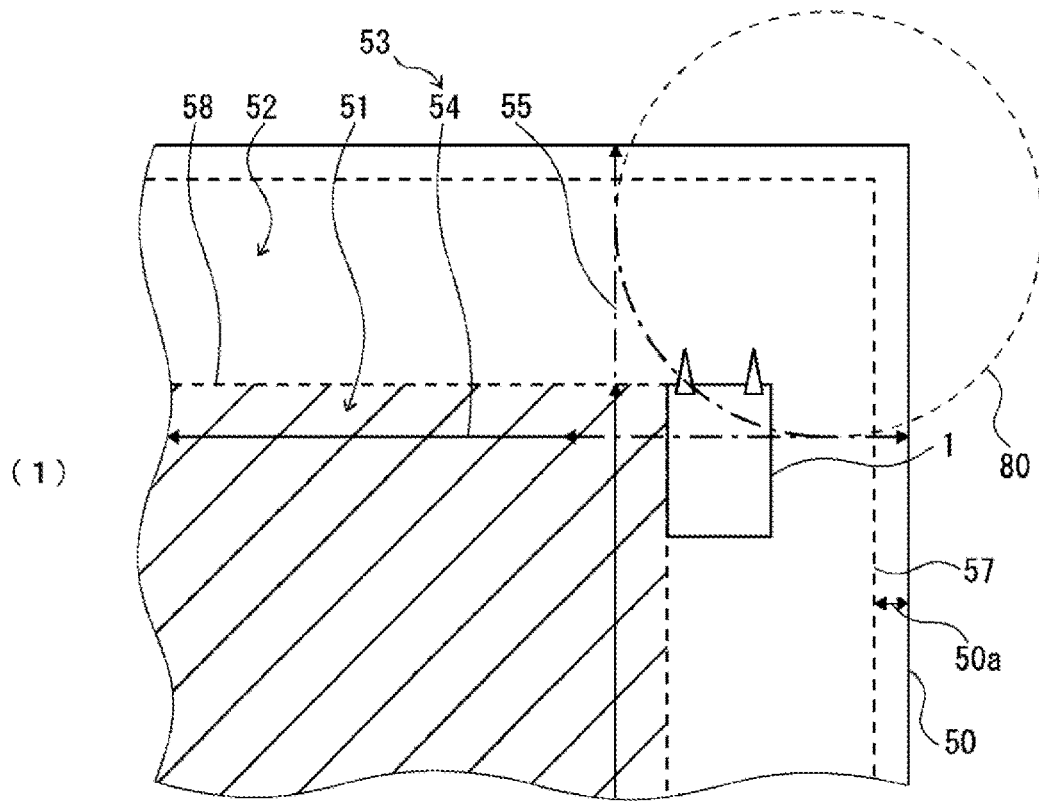
(1)
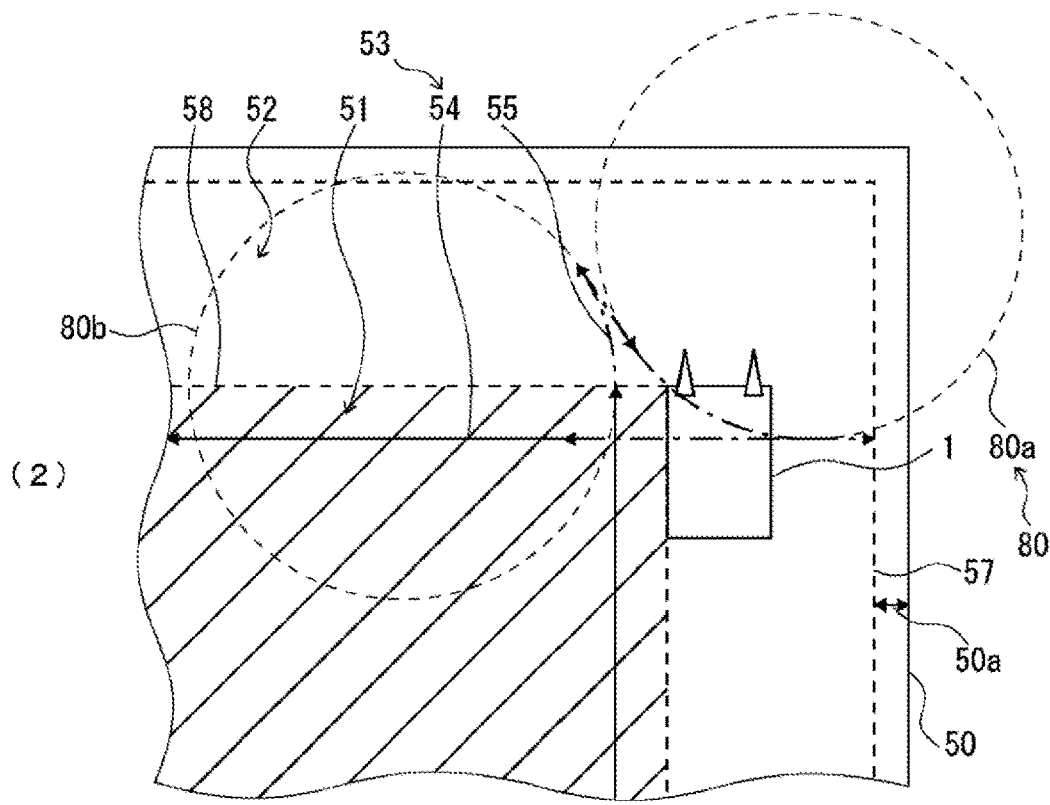
(2)

ROUTE CREATION METHOD, WORK VEHICLE, AND AUTONOMOUS TRAVEL SYSTEM

CROSS-REFERENCE

This application claims foreign priority of JP2022-193943 filed Dec. 5, 2022 and JP2023-136139 filed Aug. 24, 2023, the disclosures of which are hereby incorporated by reference in their entirety.

TECHNICAL FIELD

The present invention relates to a route creation method for creating an autonomous travel route for a work vehicle to autonomously travel in a field, to the work vehicle, and to an autonomous travel system.

BACKGROUND ART

A work vehicle such as a combine harvester performs reaping travel in a straight-ahead route along a field outline from the outermost periphery of a field to form a headland (worked region) along the field outline and forms a work region (unworked region) for autonomous travel at a position spaced apart from the field outline by a predetermined headland width. The work vehicle creates an autonomous travel route in the work region and executes autonomous reaping travel for performing reaping work while performing autonomous travel along the autonomous travel route. At this time, the work vehicle creates the autonomous travel route including a plurality of work routes for performing work in the unworked region and a turning route connecting the two work routes.

For example, in an autonomous travel control system of Patent Document 1, a control unit of a combine harvester includes a region calculation unit and a route calculation unit, and the region calculation unit calculates, as an outer peripheral region, a region on the outer peripheral side of the field in which the combine harvester travels while harvesting planted grain plants and calculates a region inside the field from the calculated outer peripheral region as a work target region. The route calculation unit calculates, inside the work target region, a harvest travel route for autonomous harvest travel and calculates a turn travel route connecting two harvest travel routes for turn travel.

PRIOR ART DOCUMENT

Patent Document

Patent Document 1: Japanese Unexamined Patent Publication No. 2021-83386

SUMMARY OF INVENTION

Technical Problem

The work vehicle performs reaping work while autonomously traveling along a work route in an unworked region of the field and autonomously turns along a turning route toward the subsequent work route in the worked region. However, in some positional relationships between the field outline and the unworked region, the work vehicle may come too close to the field outline or move out of the field during autonomous turning. Therefore, there is a need to stop the work vehicle in the middle of the autonomous travel or to correct the autonomous travel route, which reduces the work efficiency.

The present invention has an object to provide a route creation method, a work vehicle, and an autonomous travel system capable of creating an autonomous travel route without the need to stop in the middle of autonomous travel or correct the autonomous travel route.

Solution to Problem

In order to solve the above problem, a route creation method according to the present invention is a route creation method for creating an autonomous travel route for a work vehicle to autonomously travel in a field, and the route creation method includes a route creation step of creating the autonomous travel route including a plurality of work routes for the work vehicle to perform work in an unworked region of the field and a turning route connecting two of the work routes, and a route determination step of determining whether a position of the work vehicle during traveling of the work vehicle on the turning route and a position of a field outline satisfy a predetermined positional relationship with regard to the autonomous travel route created in the route creation step, confirming the autonomous travel route when it is determined that the predetermined positional relationship is satisfied, and recreating the autonomous travel route to satisfy the predetermined positional relationship when it is determined that the predetermined positional relationship is not satisfied.

Further, in order to solve the above problem, a work vehicle according to the present invention is a work vehicle that autonomously travels in a field, and the work vehicle includes a route creation unit that creates, as an autonomous travel route for the work vehicle to autonomously travel in the field, the autonomous travel route including a plurality of work routes for performing work in an unworked region of the field and a turning route connecting two of the work routes, and a route determination unit that determines whether a position of the work vehicle during traveling of the work vehicle on the turning route and a position of a field outline satisfy a predetermined positional relationship with regard to the autonomous travel route created by the route creation unit, confirms the autonomous travel route when it is determined that the predetermined positional relationship is satisfied, and recreates the autonomous travel route to satisfy the predetermined positional relationship when it is determined that the predetermined positional relationship is not satisfied.

Further, in order to solve the above problem, an autonomous travel system according to the present invention is an autonomous travel system for a work vehicle to autonomously travel in a field, and the autonomous travel system includes a route creation unit that creates, as an autonomous travel route for the work vehicle to autonomously travel in the field, the autonomous travel route including a plurality of work routes for performing work in an unworked region of the field and a turning route connecting two of the work routes, and a route determination unit that determines whether a position of the work vehicle during traveling of the work vehicle on the turning route and a position of a field outline satisfy a predetermined positional relationship with regard to the autonomous travel route created by the route creation unit, confirms the autonomous travel route when it is determined that the predetermined positional relationship is satisfied, and recreates the autonomous travel route to satisfy the predetermined positional relationship when it is determined that the predetermined positional relationship is not satisfied.

Advantageous Effects of Invention

The present invention provides a route creation method, a work vehicle, and an autonomous travel system capable of creating an autonomous travel route without the need to stop in the middle of autonomous travel or correct the autonomous travel route.

BRIEF DESCRIPTION OF DRAWINGS

FIG. 10 is a plan view illustrating an example of adjusting a turning radius of a turning route in the combine harvester according to another embodiment of the present invention.

FIG. 13 is a plan view illustrating an example in which a turning circle of a turning route is shifted in the combine harvester according to a further embodiment of the present invention.

DESCRIPTION OF EMBODIMENTS

Figure 1:
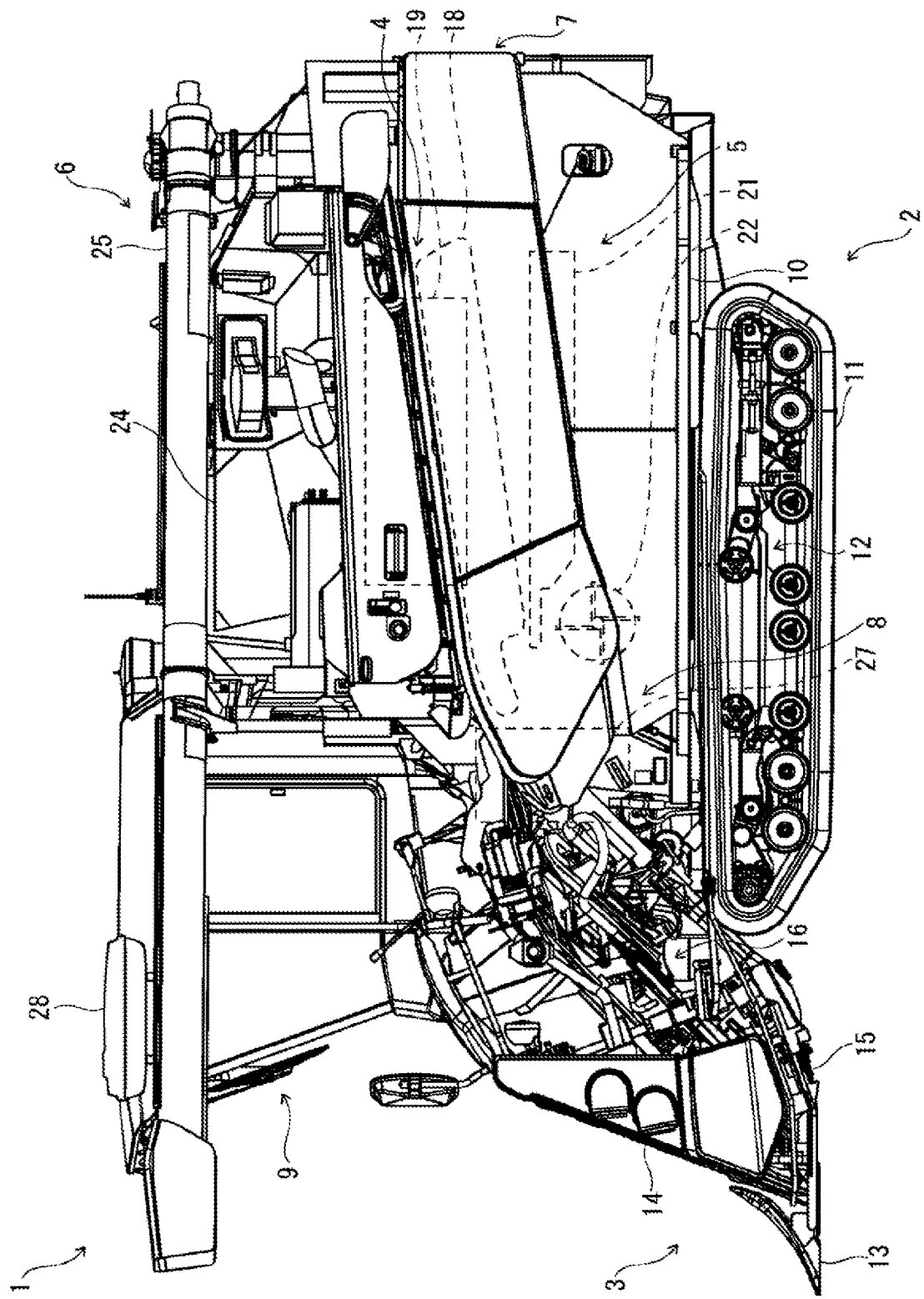
FIG. 1 is a side view of a combine harvester according to an embodiment of the present invention.

A work vehicle according to the present invention performs work while traveling in a field and, as an example of the work vehicle according to an embodiment of the present invention, a combine harvester 1, which is a harvesting machine, will be described with reference to FIG. 1, etc. By autonomous driving or manual operation, the combine harvester 1 travels in the field and performs work such as reaping to harvest crops from grain plants planted in the field. For a plurality of rows of grain plants, while traveling through linear rows in which a reaping width (work width) is a predetermined number of rows that is equal to or less than the number of possible rows for reaping, the combine harvester 1 performs a reaping work for the rows.

The combine harvester 1 is configured to perform, for example, automated work in which, while steering is controlled by autonomous driving, the traveling speed is controlled in accordance with a manual operation, and unmanned work in which the steering and the traveling speed are controlled by autonomous driving and may autonomously travel, turn, and work in the field. According to the present embodiment, the combine harvester 1 performs travel by setting any travel mode among a manual travel mode, an autonomous straight mode, and an autonomous travel mode.

When the manual travel mode is set, the combine harvester 1 is configured to perform manual travel including only travel or manual reaping travel accompanied with a reaping work in accordance with manipulation of a cockpit 9 by an operator.

When the autonomous straight mode is set, the combine harvester 1 is configured to perform autonomous straight travel to automatically perform reaping while autonomously traveling along an autonomous straight-ahead route that is parallel to a reference line set in the field. For example, when performing autonomous straight travel, the combine harvester 1 may use each of the sides constituting the field outline as a reference line and thus perform outer-periphery reaping travel to travel while revolving and reaping along the outer peripheral shape of the field.

When the autonomous travel mode is set, the combine harvester 1 is configured to perform autonomous reaping travel to automatically perform reaping while autonomously traveling along an autonomous travel route set in the field. For example, the combine harvester 1 performs autonomous reaping travel in travel patterns for, for example, reciprocating reaping to reciprocate along a plurality of linear work routes in an unreaped region (unworked region) having unreaped grain plants in the field or circling reaping to repeat circling in a linear work route along the inner periphery of an unreaped region while shifting toward the center side. Furthermore, the combine harvester 1 performs the outer-periphery reaping travel by manual travel or autonomous straight travel before performing the autonomous reaping travel to form a headland of a worked region in the field and sets an unworked region inside the headland as a work region of the autonomous reaping travel.

As illustrated in FIG. 1, the combine harvester 1 includes a traveling part 2, a reaping part 3, which is a working part, a threshing part 4, a sorting portion 5, a storage part 6, a waste straw processing unit 7, a power unit 8, and the cockpit 9 and is configured as what is called a head-feeding combine harvester. While traveling by the traveling part 2, the combine harvester 1 uses the threshing part 4 to thresh the grain plants reaped by the reaping part 3, sorts the grains by the sorting portion 5, and accumulates the grains in the storage part 6. The combine harvester 1 processes the waste straw after threshing by the waste straw processing unit 7. With the power supplied by the power unit 8, the combine harvester 1 drives the traveling part 2, the reaping part 3, the threshing part 4, the sorting portion 5, the storage part 6, and the waste straw processing unit 7.

The traveling part 2 is provided below a machine body frame 10 and includes a pair of right and left crawler traveling devices 11 and a transmission (not illustrated).

With the power (e.g., rotative power) transmitted from an engine 27 of the power unit 8, the traveling part 2 rotates crawlers of the crawler traveling devices 11 to cause the combine harvester 1 to travel in a front-back direction or turn in a right-left direction. The transmission transmits the power (rotative power) of the power unit 8 to the crawler traveling devices 11 and may also shift the rotative power.

The reaping part 3 is provided on the machine body frame 10 in front of the traveling part 2 and performs reaping work in the rows that are equal to or less than the number of possible rows for reaping. The reaping part 3 includes a divider 13, a raising device 14, a cutting device 15, and a conveying device 16. The divider 13 divides the grain plants in the field for each row and guides the grain plants corresponding to the predetermined number of rows, which is equal to or less than the number of possible rows for reaping, to the raising device 14. The raising device 14 raises the grain plants guided by the divider 13. The cutting device 15 cuts the grain plants raised by the raising device 14. The conveying device 16 conveys the grain plants cut by the cutting device 15 to the threshing part 4.

The threshing part 4 is provided behind the reaping part 3. The threshing part 4 includes a feed chain 18 and a threshing cylinder 19. The feed chain 18 conveys the grain plants conveyed from the conveying device 16 of the reaping part 3 for threshing and further conveys the threshed grain plants, i.e., waste straw, to the waste straw processing unit 7. The threshing cylinder 19 threshes the grain plants that are being conveyed by the feed chain 18.

The sorting portion 5 is provided below the threshing part 4. The sorting portion 5 includes a swing sorting device 21, an air blow sorting device 22, a grain conveying device (not illustrated), and a straw scrap discharge device (not illustrated). The swing sorting device 21 sifts the threshed product dropped from the threshing part 4 and sorts the threshed products into grains and straw scraps, etc. The air blow sorting device 22 further sorts the threshed products sorted by the swing sorting device 21 into grains and straw scraps, etc., by air blow. The grain conveying device conveys the grains sorted by the swing sorting device 21 and the air blow sorting device 22 to the storage part 6. The straw scrap discharge device discharges the straw scraps, etc., sorted out by the swing sorting device 21 and the air blow sorting device 22 to the outside of the machine.

The storage part 6 is provided on the right side of the threshing part 4. The storage part 6 includes a grain tank 24 and a discharge device 25. The grain tank 24 accumulates the grains conveyed from the sorting portion 5. The discharge device 25 includes an auger, and the like, and discharges the grains accumulated in the grain tank 24 to an optional place.

The waste straw processing unit 7 is provided behind the threshing part 4. The waste straw processing unit 7 includes a waste straw conveying device (not illustrated) and a waste straw cutting device (not illustrated). The waste straw conveying device conveys the waste straw conveyed from the feed chain 18 of the threshing part 4 to the waste straw cutting device. The waste straw cutting device cuts the waste straw conveyed by the waste straw conveying device and discharges the cut waste straw to the outside of the machine.

The power unit 8 is provided above the traveling part 2 and in front of the storage part 6. The power unit 8 includes the engine 27 that generates rotative power. The power unit 8 transmits the rotative power generated by the engine 27 to the traveling part 2, the reaping part 3, the threshing part 4, the sorting portion 5, the storage part 6, and the waste straw processing unit 7.

The cockpit 9 is provided above the power unit 8. Around the driver's seat, which is a seat where an operator is seated, the cockpit 9 includes, as a travel operating unit to manipulate travel of the combine harvester 1, a steering wheel to give an instruction to turn the machine body of the combine harvester 1, a main gearshift lever and a sub-gearshift lever to give an instruction to change the speed of forward and backward movement of the combine harvester 1, etc. Furthermore, the cockpit 9 includes a work operating unit to operate an elevating/lowering action of the reaping part 3, reaping work by the reaping part 3, threshing work by the threshing part 4, discharge work by the discharge device 25 of the storage part 6, and the like. When the manual travel mode is set, the power unit 8 and the traveling part 2 are driven in accordance with the operation of the travel operation unit of the cockpit 9 to execute manual travel of the combine harvester 1, and the power unit 8 and the reaping part 3 are driven in accordance with the operation of the work operating unit to execute manual work of the combine harvester 1.

The combine harvester 1 includes a positioning unit 28 that uses a satellite positioning system such as GPS to acquire the own vehicle position of the combine harvester 1. The positioning unit 28 receives a positioning signal from a positioning satellite via a positioning antenna and acquires position information of the positioning unit 28, i.e., the own vehicle position of the combine harvester 1, based on the positioning signal.

Next, a control device 30 of the combine harvester 1 will be described with reference to FIG. 2. The control device 30 includes a computer such as a CPU and is connected to a storage 31 such as a ROM, a RAM, a hard disk drive, and a flash memory, and to a communication unit 32 that communicates with an external device.

The storage 31 stores programs and data for controlling various components and various functions of the combine harvester 1, and the control device 30 executes arithmetic processing based on the programs and data stored in the storage 31 to control the various components and the various functions. The control device 30 acquires, for example, the own vehicle position of the combine harvester 1 from the positioning unit 28 and also acquires the traveling direction at the own vehicle position of the combine harvester 1.

The communication unit 32 may wirelessly communicate with external devices, such as a portable terminal 40 possessed by the operator, via a wireless communication antenna. The control device 30 controls the communication unit 32 to perform wireless communications with the portable terminal 40 and transmits and receives various types of information to and from the portable terminal 40. For example, the communication unit 32 receives the field information set for the field, autonomous straight-ahead routes, autonomous travel routes, and the like, from the portable terminal 40 and stores them in the storage 31.

For example, as illustrated in FIGS. 3 to 8, the field includes, within a field outline 50 that is an outline along the outer periphery of the field, an unworked region 51 in which work such as reaping has not been performed yet and a worked region 52 in which work has already been finished. The field information includes information such as the shape, size, and position information (coordinates, etc.) of the field outline 50, and the shapes, sizes, and position information (coordinates, etc.) of the unworked region 51 and the worked region 52. The autonomous straight-ahead route and the autonomous travel route 53 set for the field include travel information about travel and work information about work such as automatic reaping. The travel information includes, in addition to travel positions in the field, the traveling direction and the set vehicle speed at each travel position. The work information includes information about activation or stop of various works such as reaping work at each travel position and information about the elevating/lowering action of the reaping part 3.

The autonomous travel route 53 includes a plurality of work routes 54 for performing work in the unworked region 51 and a turning route 55 connecting the two work routes 54. Further, in order to prevent entry to the unworked region 51 during turning, the turning route 55 is created so as to include the route portion of a rear path leg for forward movement in a straight line by a predetermined distance from the end point of the previous work route 54 on the extension of the previous work route 54 and the route portion of a front path leg for forward movement in a straight line by a predetermined distance to the subsequent work route 54 on the extension of the subsequent work route 54. The lengths of the rear path leg and the front path leg depend on the machine length of the combine harvester 1, and therefore the longer the machine length is, the longer the rear path leg and the front path leg are, and the longer the turning route is.

Figure 3:
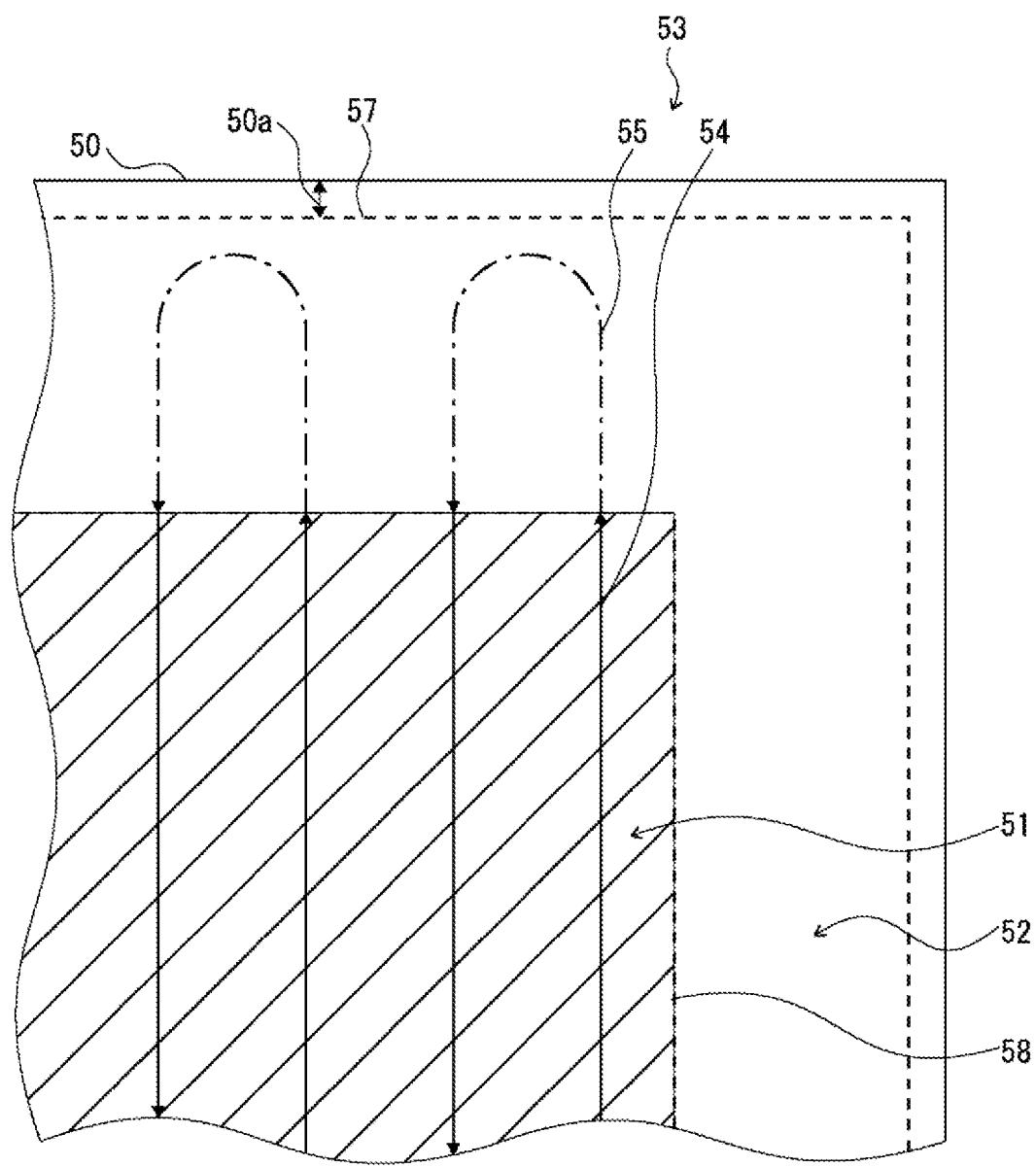
FIG. 3 is a plan view illustrating an example of a turning route of a U-shaped turn by the combine harvester according to an embodiment of the present invention.
Figure 4:
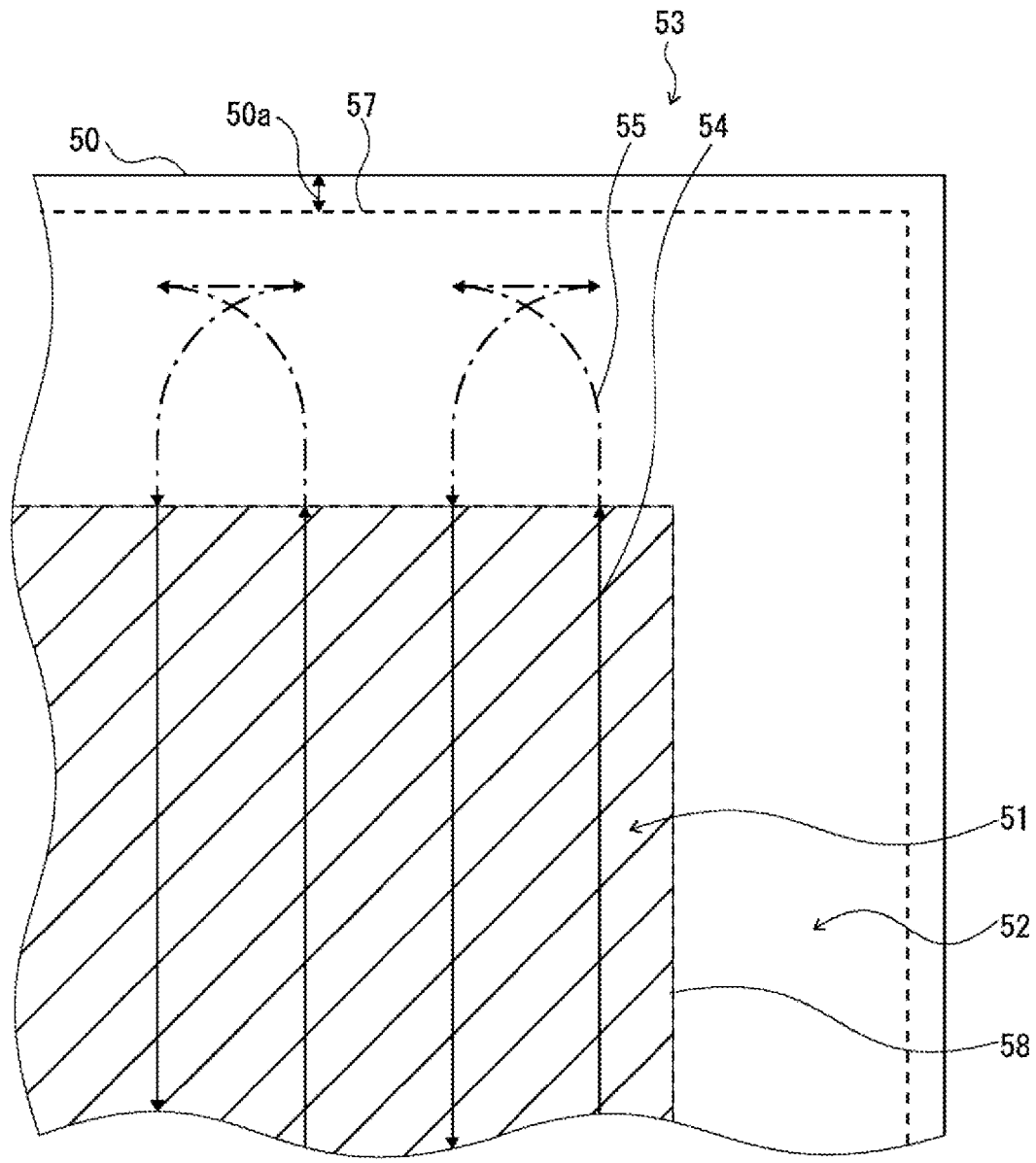
FIG. 4 is a plan view illustrating an example of a turning route of a fishtail turn by the combine harvester according to an embodiment of the present invention.
Figure 5:
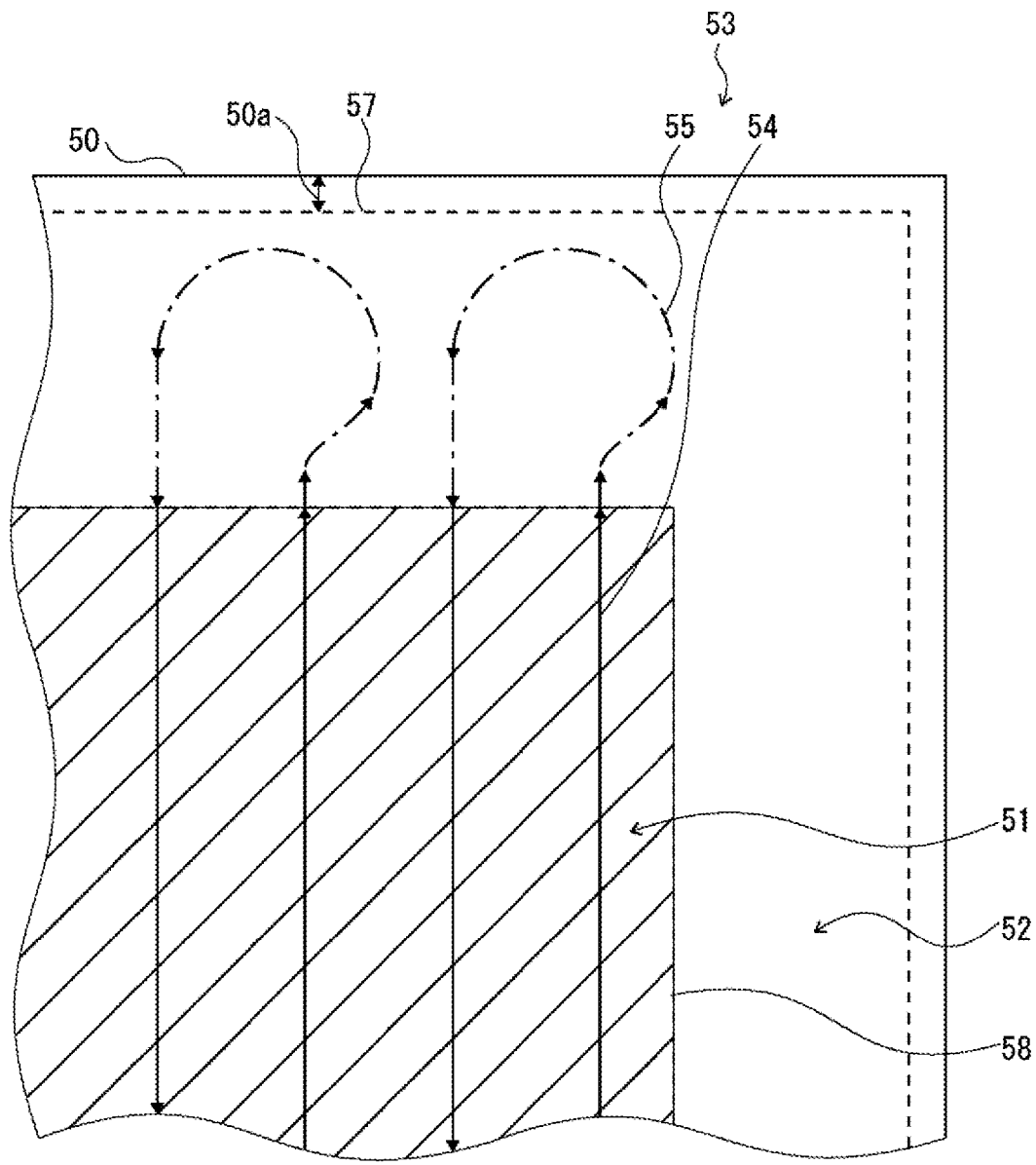
FIG. 5 is a plan view illustrating an example of a turning route of a hook turn by the combine harvester according to an embodiment of the present invention.

As illustrated in FIGS. 3 to 5, in the autonomous travel route 53 for reciprocating reaping, the work routes 54 are arranged in parallel in the unworked region 51, and the turning route 55 connecting the end portions of the two work routes 54 is arranged in the worked region 52. The turning route 55 for reciprocating reaping is set so as to turn by any turning method such as U-shaped turn, fishtail turn, or hook turn.

As illustrated in FIG. 3, the U-shaped turn is a turning method by turning by 180 degrees counterclockwise or clockwise only by forward movement from the previous work route 54 and entering the subsequent work route 54 in a straight line. As illustrated in FIG. 4, the fishtail turn is a turning method by, after turning by 90 degrees counterclockwise or clockwise by forward movement from the previous work route 54, moving backward by a certain distance, then turning by 90 degrees counterclockwise or clockwise by forward movement, and entering the subsequent work route 54 in a straight line. As illustrated in FIG. 5, the hook turn is a turning method by, after turning so as to curve once to right or left by forward movement from the previous work route 54, turning by 180 degrees counterclockwise or clockwise by forward movement, and entering the subsequent work route 54 in a straight line. As the hook turn makes a curve in a width direction with respect to the work route 54, it is possible to prevent curving in the extending direction with respect to the work route 54.

Figure 6:
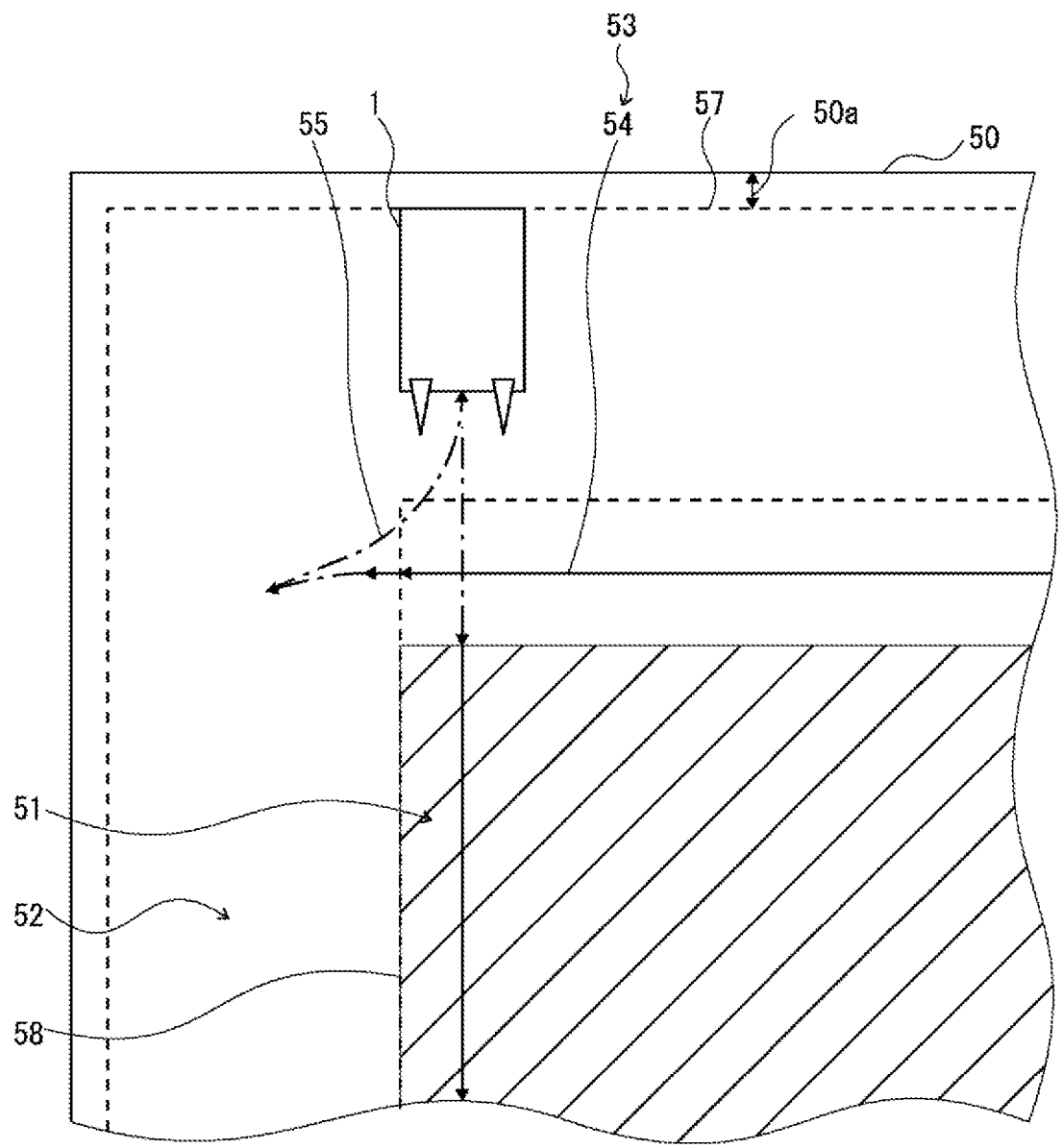
FIG. 6 is a plan view illustrating an example of a turning route of single-$\alpha$ turn by the combine harvester according to an embodiment of the present invention.
Figure 7:
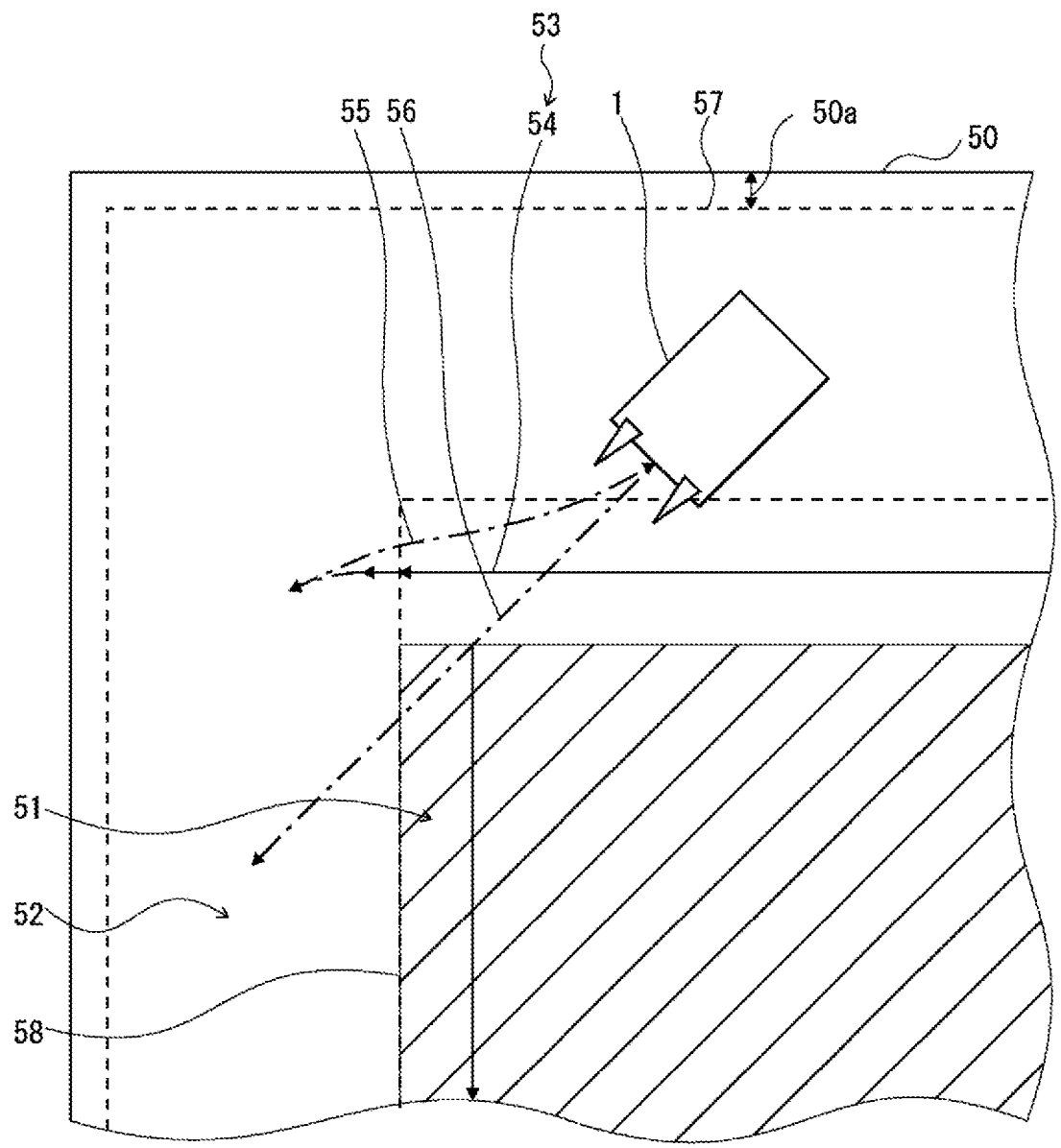
FIG. 7 is a plan view illustrating an example of a turning route of a multi-$\alpha$ turn by the combine harvester according to an embodiment of the present invention.
Figure 8:
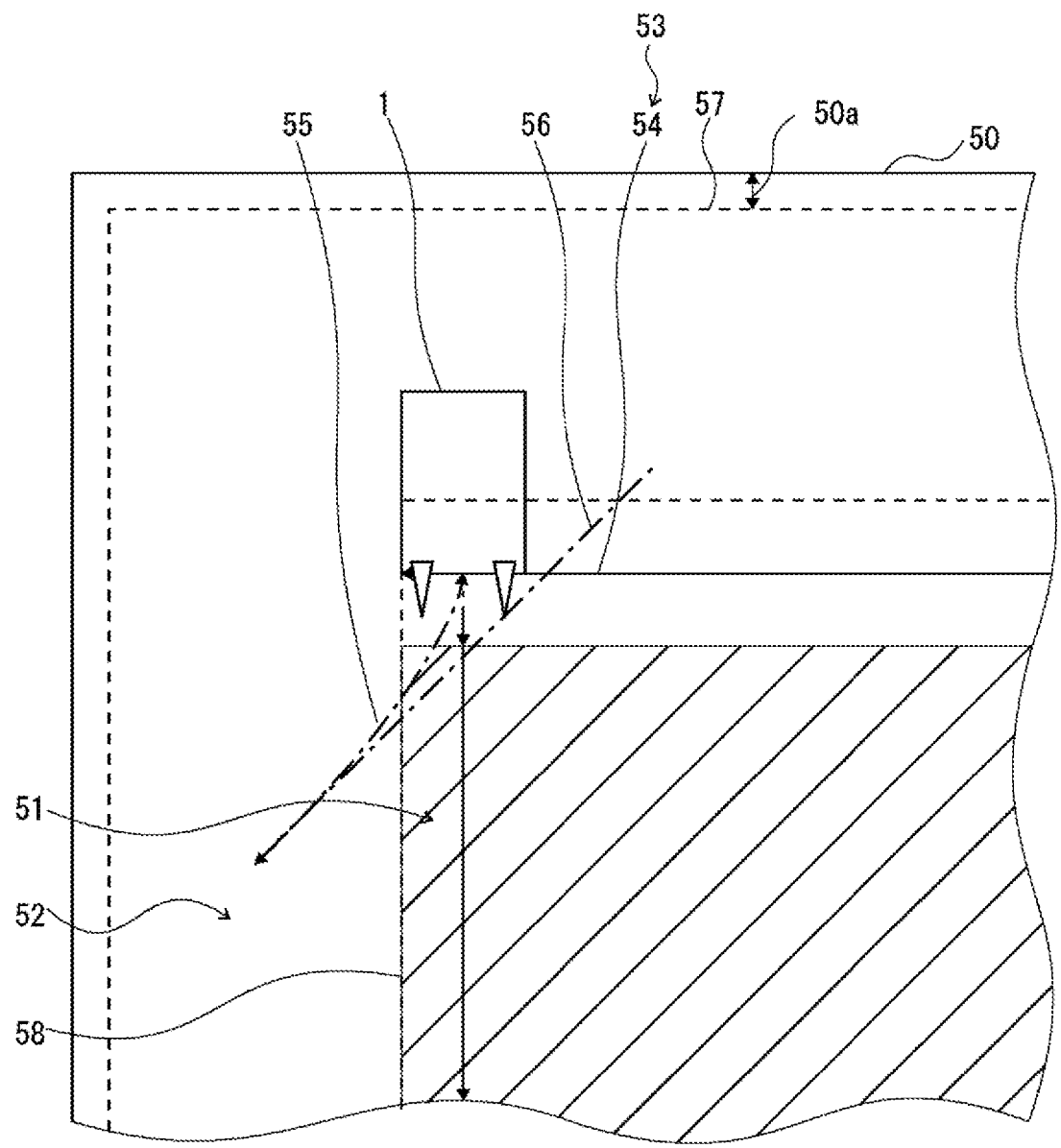
FIG. 8 is a plan view illustrating an example of a turning route of the multi-$\alpha$ turn by the combine harvester according to an embodiment of the present invention.

As illustrated in FIGS. 6 to 8, in the autonomous travel route 53 for circling reaping, the work routes 54 are arranged in the unworked region 51 so as to repeat circling while shifting toward the center side, and the turning route 55 connecting the end portions of the two work routes 54 is arranged in the worked region 52. The turning route 55 for circling reaping is set as a corner turning route at a position located at a corner of the unworked region 51 so as to make a turn by any turning method such as single-α turn or multi-α turn.

As illustrated in FIG. 6, the single-α turn is a turning method by, after moving forward by a certain distance from the previous work route 54, turning by 90 degrees clockwise or counterclockwise by backward movement, and then switching to forward movement to enter the subsequent work route 54 in a straight line. Furthermore, the α turn may make a turn so as to slightly curve to right or left once when moving forward by a certain distance from the previous work route 54.

The multi-α turn is a turning method by separately making the single-α turn multiple times, and for example, as illustrated in FIG. 7, the α turns separated into two are, in the same manner as the single-α turn, moving forward by a certain distance from the previous work route 54, then turning backward at a predetermined angle clockwise or counterclockwise, then moving forward along an inclined route 56, which is inclined at a predetermined inclination angle (e.g., 45 degrees) with respect to the previous work route 54, further turning backward at a predetermined angle clockwise or counterclockwise as illustrated in FIG. 8, then switching to forward movement to enter the subsequent work route 54 in a straight line. Accordingly, as compared with the single-α turn, the multi-α turn allows entry to the subsequent work route 54 in a straight line at a position closer to the inner side of the field and opposed to the unworked region 51.

As described above, the α turns separated into two include the one inclined route 56 from the previous work route 54 to the subsequent work route 54, that is, the α turn separated into n includes the n−1 inclined route 56. For the multi-α turn, the inclination angle of the inclined route 56 is set by dividing the angle formed between the previous work route 54 and the subsequent work route 54 by the number of α turns. Furthermore, each of the inclined routes 56 in the multi-α turn may be set as a reaping route for performing reaping travel to reap at a corner of the unworked region 51.

Further, the control device 30 executes a program stored in the storage 31 to act as a travel control unit 35. Moreover, the travel control unit 35 performs a travel control step of a route creation method according to the present invention.

When the autonomous straight mode is set, the travel control unit 35 controls the autonomous straight travel of the combine harvester 1. For example, the travel control unit 35 acquires, from the portable terminal 40, the field information set for the field and an autonomous straight-ahead route related to the reference line set for the field. When the autonomous straight travel starts in response to an operation of the portable terminal 40, the travel control unit 35 acquires the own vehicle position of the combine harvester 1 from the positioning unit 28 and, based on the own vehicle position, the field information, and the autonomous straight-ahead route, controls the power unit 8, the traveling part 2, and the reaping part 3 such that the combine harvester 1 performs the autonomous straight travel along the autonomous straight-ahead route.

When the autonomous travel mode is set, the travel control unit 35 controls the autonomous reaping travel of the combine harvester 1. For example, the travel control unit 35 acquires the field information set for the field and the autonomous travel route 53 from the portable terminal 40. When the autonomous reaping travel starts in response to an operation of the portable terminal 40, the travel control unit 35 acquires the own vehicle position of the combine harvester 1 from the positioning unit 28 and, based on the own vehicle position, the field information, and the autonomous travel route 53, controls the power unit 8, the traveling part 2, and the reaping part 3 such that the combine harvester 1 performs the autonomous reaping travel along the autonomous travel route 53.

Furthermore, in a case where a route creation permission region 58 is set, in which creation of the work route 54 in the autonomous travel route 53 is permitted, the travel control unit 35 may enable execution of the autonomous reaping travel when the worked region 52 reaches the route creation permission region 58 due to the outer-periphery reaping travel by manual travel or autonomous straight travel and may disable the autonomous reaping travel when the worked region 52 does not reach the route creation permission region 58.

Further, when the combine harvester 1 autonomously travels on the inclined route 56 included in the turning route 55 that is the multi-α turn, the travel control unit 35 may control a rolling mechanism included in the traveling part 2, a lifting/lowering device included in the reaping part 3, or the like, to increase the height of one side of the reaping part 3 in the machine body width direction of the combine harvester 1 and set the normal reaping height of the other side of the reaping part 3. Specifically, when one side of the reaping part 3 in the machine body width direction of the combine harvester 1 passes through the worked region 52 and the other side thereof passes through the unworked region 51, the travel control unit 35 performs control to increase the height of one side of the reaping part 3. Further, when one side of the reaping part 3 enters the unworked region 51, the travel control unit 35 automatically cancels the inclination of the reaping part 3 and arranges the reaping part 3 horizontal in the machine body width direction with respect to the field surface (ground surface).

The portable terminal 40, which is one of the components of the combine harvester 1, is a terminal that may remotely operate the combine harvester 1 and includes, for example, a tablet terminal including a touch panel, a laptop personal computer, or the like. Further, the cockpit 9 may include an operation device similar to the portable terminal 40.

According to the present invention, the combine harvester 1, the portable terminal 40, and the like, constitute an autonomous travel system.

Figure 2:
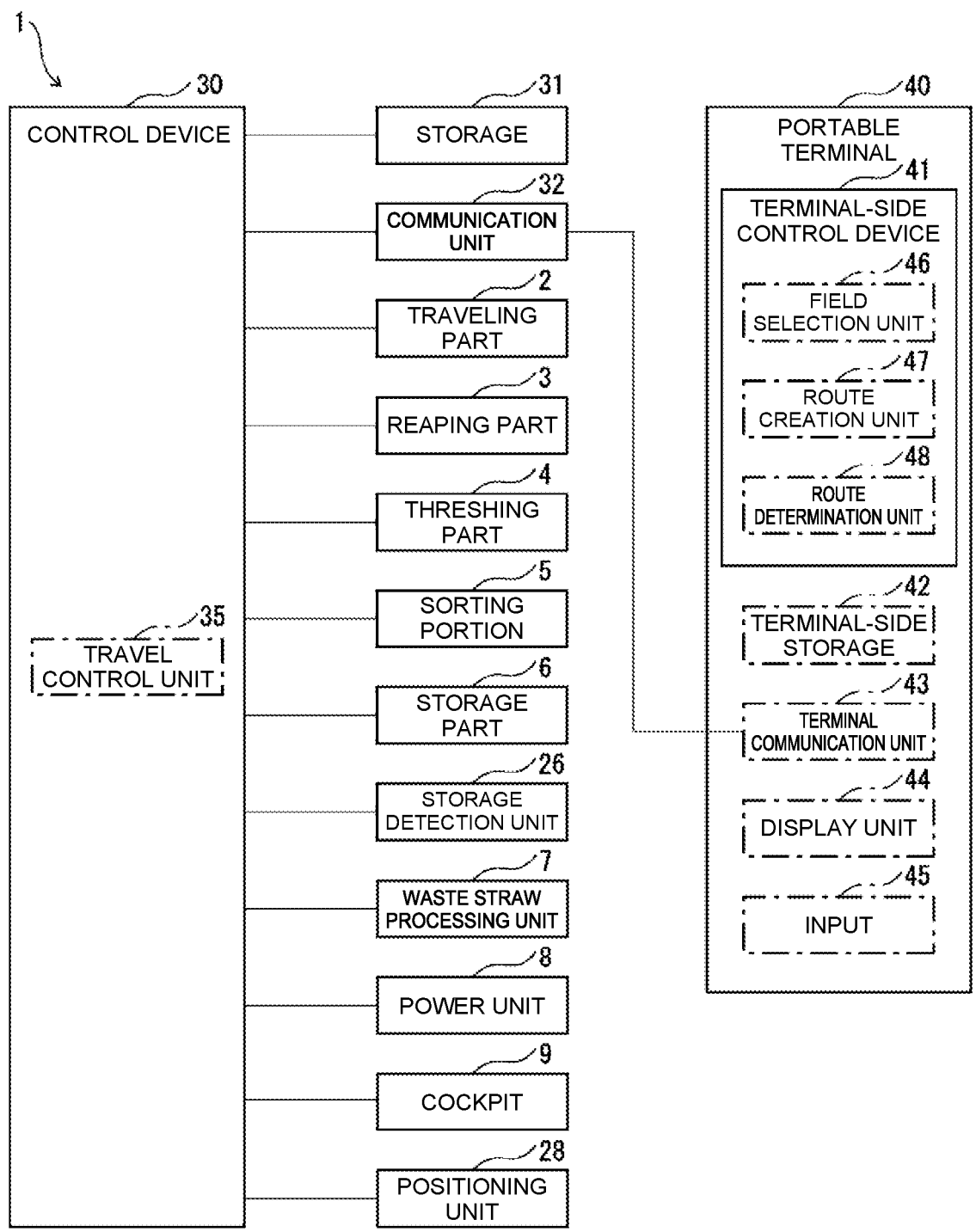
FIG. 2 is a block diagram of the combine harvester according to an embodiment of the present invention.

As illustrated in FIG. 2, the portable terminal 40 includes a terminal-side control device 41 including a computer such as a CPU, and the terminal-side control device 41 is connected to a terminal-side storage 42 such as a ROM, a RAM, a hard disk drive, and a flash memory and to a terminal communication unit 43 that communicates with external devices. Further, the portable terminal 40 includes a display unit 44, such as a touch panel or a monitor, to display various types of information and output the information to the operator and includes an input 45, such as a touch panel or an operation key, to receive input operations of various types of information from the operator.

The terminal-side storage 42 stores programs and data to control various components and various functions of the portable terminal 40, and the terminal-side control device 41 executes arithmetic processing based on the programs and data stored in the terminal-side storage 42 to control various components and various functions of the portable terminal 40. The terminal-side storage 42 stores the field information on the field, which is a work target of the combine harvester 1, the autonomous straight-ahead route, the autonomous travel route 53, and the like.

The terminal communication unit 43 is communicably connected to the communication unit 32 of the combine harvester 1 via a wireless communication antenna. The terminal-side control device 41 controls the terminal communication unit 43 to perform wireless communications with the combine harvester 1 and transmits and receives various types of information to and from the combine harvester 1.

The terminal-side control device 41 of the portable terminal 40 executes programs stored in the terminal-side storage 42 to act as a field selection unit 46, a route creation unit 47, and a route determination unit 48.

Further, the route creation unit 47 and the route determination unit 48 perform a route creation step and a route determination step of a route creation method according to the present invention.

The field selection unit 46 manually or automatically selects the field, which is a work target of autonomous travel, sets the outer peripheral shape of the field, i.e., the field outline 50, and stores the field outline 50 in the terminal-side storage 42. For example, the field selection unit 46 displays, on the display unit 44, a field selection screen (not illustrated) for selecting the field that is a work target. When the terminal-side storage 42 already stores the field information including the field outline 50, the field selection screen enables selection of the field corresponding to the field information. When any field is selected on the field selection screen in response to a manual operation, the field selection unit 46 selects the field, which has been operated for selection, as a work target and reads the field information corresponding to the selected field from the terminal-side storage 42.

Further, the field selection screen allows an operation to create a new field. When an operation is performed to create a new field on the field selection screen, the field selection unit 46 selects a new field at the own vehicle position of the combine harvester 1 as a work target. Further, when the combine harvester 1 circles along the outer peripheral shape of the new field to perform outer-periphery reaping travel, the field selection unit 46 receives, from the combine harvester 1, the own vehicle position of the combine harvester 1 determined by the positioning unit 28 of the combine harvester 1 and records the position information of the outer peripheral shape of the new field and the position information of the route for outer-periphery reaping travel. The field selection unit 46 creates the field outline 50 of the new field based on the position information acquired during the outer-periphery reaping travel, creates the field information including the field outline 50, and stores the field information in the terminal-side storage 42.

When the autonomous straight mode is set, the route creation unit 47 creates the autonomous straight-ahead route based on a predetermined reference line, stores the autonomous straight-ahead route in the terminal-side storage 42, and transmits the autonomous straight-ahead route to the combine harvester 1 via the terminal communication unit 43. For example, the route creation unit 47 creates, over the entire region of the field, the autonomous straight-ahead route including straight-ahead routes that are straight lines parallel to the reference line and are arranged at intervals of a work width of the combine harvester 1 from the reference line. Furthermore, considering that the lateral center of the combine harvester 1 passes through the autonomous straight-ahead route, the route creation unit 47 arranges the autonomous straight-ahead route (outermost peripheral straight-ahead route) closest to the reference line, which is each of the sides constituting the field outline 50, at an interval of one half of the work width of the combine harvester 1 from the reference line and sequentially arranges the other autonomous straight-ahead routes at intervals of the work width of the combine harvester 1. Alternatively, the route creation unit 47 may create, over the entire region of the field, the autonomous straight-ahead route that includes a straight-ahead route, which is a straight line parallel to the reference line and passes through the own vehicle position of the combine harvester 1 or the position ahead of the own vehicle position by a predetermined distance and a plurality of straight-ahead routes arranged at intervals of the work width of the combine harvester 1 from the straight-ahead route.

For example, when the autonomous straight mode is set so that the combine harvester 1 performs outer-periphery reaping travel to form a headland in the field, the route creation unit 47 creates the autonomous straight-ahead route to perform the autonomous straight travel corresponding to the outer-periphery reaping travel. At this time, the route creation unit 47 sets each of the sides (outline sides) constituting the field outline 50 as the reference line based on the field information of the field selected by the field selection unit 46. Further, as illustrated in FIGS. 3 to 8, the route creation unit 47 may set an autonomous travel enabling region 57 (see a broken line) with a predetermined safety margin 50a from the reference line, which is an outline side, and create an autonomous straight-ahead route within the range of the autonomous travel enabling region 57. Alternatively, the route creation unit 47 may set a parallel straight line with the safety margin 50a from the outline side as the reference line to set the autonomous travel enabling region 57 with the safety margin 50a from the outline side and create the autonomous straight-ahead route within the range of the autonomous travel enabling region 57. Furthermore, the route creation unit 47 may previously set the safety margin 50a to a predetermined value or may enable setting of the safety margin 50a in accordance with a predetermined setting operation via a predetermined display screen displayed on the display unit 44.

Further, when the autonomous travel mode is set, the route creation unit 47 creates the autonomous travel route 53 for autonomous reaping travel in the field selected by the field selection unit 46 and, when the route determination unit 48 confirms the autonomous travel route 53, stores the autonomous travel route 53 in the terminal-side storage 42 and transmits the autonomous travel route 53 to the combine harvester 1 via the terminal communication unit 43. The route creation unit 47 creates the plurality of work routes 54 for performing reaping work while traveling in the forward direction in the unworked region 51 and creates the turning route 55 connecting the two work routes 54 for each of the two continuous work routes 54 in accordance with a travel pattern (reciprocating reaping or circling reaping) selected by the operation of the portable terminal 40 for the field and creates the autonomous travel route 53 including the plurality of work routes 54 and each of the turning routes 55.

The route creation unit 47 creates each of the turning routes 55 by using, for example, a preset turning method or a turning method determined based on the field information or the machine body information (machine body width, machine body length, and the like) of the combine harvester 1. Specifically, when the autonomous travel route 53 for reciprocating reaping is created, the route creation unit 47 usually creates the turning route 55 by setting a turning method of U-shaped turn as illustrated in FIG. 3. Furthermore, when the autonomous travel route 53 for circling reaping is created, the route creation unit 47 usually creates the turning route 55 by setting a turning method of the single-α turn as illustrated in FIG. 6 as the corner turning route at a position located at a corner of the unworked region 51.

Further, as illustrated in FIGS. 3 to 8, the route creation unit 47 sets the route creation permission region 58 (see a broken line) for permitting creation of the work route 54 in the autonomous travel route 53 inside the field outline 50 and enables creation of the autonomous travel route 53 such that the work route 54 is provided within the range of the route creation permission region 58, which is the unworked region 51, when the worked region 52 reaches the route creation permission region 58 by outer-periphery reaping travel. Furthermore, the route creation unit 47 may previously set the route creation permission region 58 based on the field information and the machine body information of the combine harvester 1 or may enable setting of the route creation permission region 58 in accordance with a predetermined setting operation via a predetermined display screen displayed on the display unit 44.

When the autonomous travel mode is set and the autonomous travel route 53 is created by the route creation unit 47, the route determination unit 48 determines whether the position of the combine harvester 1 during traveling of the combine harvester 1 on the turning route 55 and the position of the field outline 50 satisfy a predetermined positional relationship with regard to the autonomous travel route 53. Further, the route determination unit 48 confirms the autonomous travel route 53 when it is determined that the predetermined positional relationship is satisfied and, recreates the autonomous travel route 53 to satisfy the predetermined positional relationship when it is determined that the predetermined positional relationship is not satisfied.

At this time, the route determination unit 48 conducts travel simulation during traveling of the combine harvester 1 on the autonomous travel route 53 (in particular, the turning route 55) and, based on the position information of the turning route 55 and the position information and the machine body information of the combine harvester 1, calculates the position information of the machine body outline of the combine harvester 1 during traveling on the turning route 55, and determines the position of the machine body outline of the combine harvester 1 during traveling on the turning route 55 with respect to the field outline 50.

When it is determined that at least a part of the combine harvester 1 (in particular, the machine body outline thereof) during traveling on the turning route 55 is located inside the range of the field outline 50 or the autonomous travel enabling region 57 over the entire turning route 55, the route determination unit 48 determines that the predetermined positional relationship is satisfied and, when it is determined that at least a part of the combine harvester 1 is located outside the range of the field outline 50 or the autonomous travel enabling region 57 in at least a part of the turning route 55, determines that the predetermined positional relationship is not satisfied. Furthermore, the route determination unit 48 may specify the turning route 55 where the combine harvester 1 is located outside the range of the field outline 50 or the autonomous travel enabling region 57.

The route determination unit 48 changes, for example, the turning method of the turning route 55 as a measure for recreating the autonomous travel route 53 such that the position of the combine harvester 1 traveling on the turning route 55 satisfies the predetermined positional relationship.

In the case of the autonomous travel route 53 for reciprocating reaping, the route determination unit 48 changes the turning method of the turning route 55 from the U-shaped turn to the fishtail turn or the hook turn. Further, about changing the turning method to the fishtail turn or the hook turn, the route determination unit 48 may automatically set the turning method such that the combine harvester 1 is not located outside the range of the field outline 50 or the autonomous travel enabling region 57 based on the position information of the turning route 55 and the position information and the machine body information of the combine harvester 1. Alternatively, the route determination unit 48 may previously set whether to change the turning method to the fishtail turn or the hook turn or may enable setting in accordance with a predetermined setting operation via a predetermined display screen displayed on the display unit 44.

Furthermore, in the case of the autonomous travel route 53 for circling reaping, the route determination unit 48 changes the turning method of the turning route 55 from the single-α turn to the multi-α turn as the corner turning route at the position located at the corner of the unworked region 51. Moreover, the route determination unit 48 may set the inclined route 56 in the multi-α turn as a route for traveling only on the worked region 52 or as a reaping route for performing reaping travel to reap at the corner of the unworked region 51.

The route determination unit 48 may automatically set at least one of the inclination angle and the number of the inclined routes 56 (including the reaping route) included in the multi-α turn or may automatically set the number of a turns such that the position of the combine harvester 1 traveling on the turning route 55 satisfies the predetermined positional relationship. In other words, the route determination unit 48 automatically sets the inclination angle and the number of the inclined routes 56 or the number of a turns based on the position information of the turning route 55 and the position information and the machine body information of the combine harvester 1 such that the combine harvester 1 is not located outside the range of the field outline 50 or the autonomous travel enabling region 57.

For example, the route determination unit 48 assumes the state where the multi-α turn including the one inclined route 56 is set at the corner of the unworked region 51, inclines the inclined route 56 by a predetermined angle, and determines whether the combine harvester 1 satisfies the predetermined positional relationship. Then, the route determination unit 48 sets the angle of the inclined route 56, at which the predetermined positional relationship is satisfied, as the inclination angle and sets the number of the inclined routes 56 to one. Conversely, in the case where the upper limit angle of the inclined route 56 is set, when the combine harvester 1 does not satisfy the predetermined positional relationship even if the inclination angle of the inclined route 56 is set to the upper limit angle, the route determination unit 48 assumes the state where the multi-α turn including the two inclined routes 56 is set at the corner of the unworked region 51 and determines the inclination angle in the same manner as described above. In this way, the route determination unit 48 sets the angle and the number of the inclined routes 56 that satisfy the predetermined positional relationship.

Alternatively, the route determination unit 48 may previously set the inclination angle and the number of the inclined routes 56 included in the multi-α turn or the number of the a turns or may enable setting in accordance with a predetermined setting operation via a predetermined display screen displayed on the display unit 44.

Further, the route determination unit 48 may automatically select whether each of the inclined routes 56 of the multi-α turn is set as a reaping route such that the position of the combine harvester 1 traveling on the turning route 55 satisfies the predetermined positional relationship. In other words, based on the position information of the turning route 55 and the position information and the machine body information of the combine harvester 1, the route determination unit 48 automatically selects whether each of the inclined routes 56 of the multi-α turn is set as a reaping route such that the combine harvester 1 is not located outside the range of the field outline 50 or the autonomous travel enabling region 57. Alternatively, the route determination unit 48 may previously set whether each of the inclined routes 56 of the multi-α turn is set as a reaping route or may enable setting in accordance with a predetermined setting operation via a predetermined display screen displayed on the display unit 44.

Further, when the number of the inclined routes 56 (including the reaping route) in the multi-α turn or the number of a turns may be set in accordance with a predetermined setting operation, the route determination unit 48 may set, inside the field outline 50, the route creation permission region 58 for permitting creation of the work route 54 in the autonomous travel route 53 in accordance with the set number. Furthermore, as the number of the inclined routes 56 that is set in accordance with the predetermined setting operation, the route determination unit 48 may enable setting of the maximum number that is set for one corner of the unworked region 51 or may enable setting of the total number that is set for all the corners of the unworked region 51.

For example, the route determination unit 48 sets the number of a turns in the turning route 55 to calculate the inclination angle and the number of the inclined routes 56 included in the multi-α turn. Further, the route determination unit 48 calculates the region needed for turning in the multi-α turn based on the inclination angle and the number of the inclined routes 56, calculates the headland width based on the calculated region, and calculates the route creation permission region 58 based on the calculated headland width.

Alternatively, when the route creation permission region 58 for permitting creation of the work route 54 in the autonomous travel route 53 may be set inside the field outline 50 in accordance with the predetermined setting operation, the route determination unit 48 sets the number of the inclined routes 56 (including the reaping route) in the multi-α turn or the number of a turns in accordance with the set route creation permission region 58. For example, the route determination unit 48 calculates and sets the number of the inclined routes 56 or the number of a turns based on the route creation permission region 58 by a procedure reverse to the above.

Furthermore, when it is determined that the position of the combine harvester 1 traveling on the turning route 55 does not satisfy the predetermined positional relationship, the route determination unit 48 may enable selection whether to recreate the autonomous travel route 53 to satisfy the predetermined positional relationship or to further perform the outer-periphery reaping travel on the unworked region 51 before confirming the autonomous travel route 53, in accordance with a predetermined selection operation via a predetermined display screen displayed on the display unit 44. Here, when further outer-periphery reaping travel is selected, the route determination unit 48 may end the autonomous travel mode without confirming the autonomous travel route 53. Furthermore, the route determination unit 48 may prompt the operator to perform further outer-periphery reaping travel by manual travel or autonomous straight travel on a predetermined display screen displayed on the display unit 44.

Furthermore, in a case where further outer-periphery reaping travel is selected, when the autonomous travel mode is set after the outer-periphery reaping travel is further performed by manual travel or autonomous straight travel, the route creation unit 47 sets the plurality of work routes 54 in the unworked region 51 formed by the further outer-periphery reaping travel and sets the turning route 55 in the worked region 52 formed by the further outer-periphery reaping travel to newly create the autonomous travel route 53. Then, the route determination unit 48 determines whether the predetermined positional relationship is satisfied in the same manner as described above with regard to the newly created autonomous travel route 53.

Furthermore, when it is determined that the position of the combine harvester 1 traveling on the turning route 55 does not satisfy the predetermined positional relationship, the route determination unit 48 may enable selection whether to shift the route creation permission region 58 for permitting creation of the work route 54 in the autonomous travel route 53 further to the inner side of the field before recreating the autonomous travel route 53 to satisfy the predetermined positional relationship, in accordance with a predetermined selection operation via a predetermined display screen displayed on the display unit 44. Here, when no shift of the route creation permission region 58 to the inner side is selected, the route determination unit 48 recreates the autonomous travel route 53 to satisfy the predetermined positional relationship.

Conversely, when shift of the route creation permission region 58 to the inner side is selected, the route determination unit 48 calculates the position of the corner of the unworked region 51 such that the corner turning route satisfies the predetermined positional relationship even when the turning method of the single-α turn is set, for example. Then, the route determination unit 48 calculates the position of the corner of the route creation permission region 58 based on the calculated position of the corner of the unworked region 51 and sets the route creation permission region 58 so as to take the calculated position of the corner of the route creation permission region 58. At this time, the route determination unit 48 may shift the original route creation permission region 58 to the inner side at intervals of the work width of the combine harvester 1 to reset the route creation permission region 58.

When the route creation permission region 58 is shifted to the inner side, the worked region 52 does not reach the route creation permission region 58, and therefore, the route determination unit 48 may end the autonomous travel mode without confirming the autonomous travel route 53 set in the original route creation permission region 58. Moreover, the route determination unit 48 may prompt the operator to further perform the outer-periphery reaping travel to the reset route creation permission region 58 by manual travel or autonomous straight travel on a predetermined display screen displayed on the display unit 44.

Furthermore, when the autonomous travel mode is set after the further outer-periphery reaping travel is performed by manual travel or autonomous straight travel to the reset route creation permission region 58, the route creation unit 47 sets the plurality of work routes 54 in the unworked region 51 formed by the further outer-periphery reaping travel and sets the turning route 55 in the worked region 52 formed by the further outer-periphery reaping travel to newly create the autonomous travel route 53. Then, the route determination unit 48 determines whether the predetermined positional relationship is satisfied in the same manner as described above with regard to the newly created autonomous travel route 53.

Figure 9:
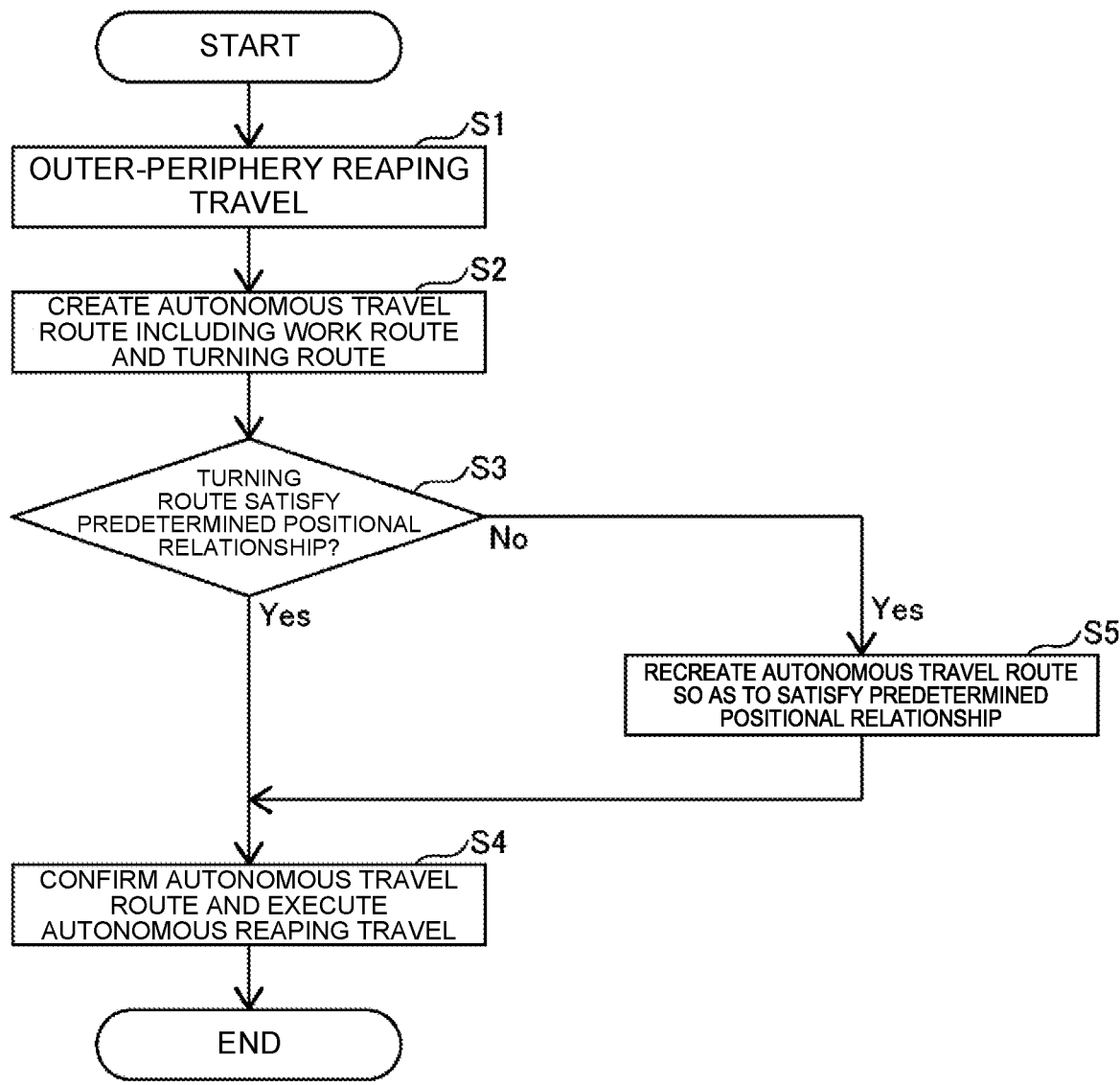
FIG. 9 is a flowchart illustrating an example of an action of the combine harvester according to an embodiment of the present invention.

Next, an action example of the combine harvester 1 according to the present embodiment will be described with reference to a flowchart in FIG. 9.

First, when the manual travel mode or the autonomous straight mode is set, the combine harvester 1 performs the outer-periphery reaping travel along the outer peripheral shape of the field to form the worked region 52 in the field and thus form a headland (Step S1).

Next, in the combine harvester 1, when the autonomous travel mode is set, the route creation unit 47 creates the autonomous travel route 53 including the plurality of work routes 54 for performing work in the unworked region 51 inside the worked region 52 and the turning route 55 connecting the two work routes 54 (Step S2).

Then, the route determination unit 48 determines whether the position of the combine harvester 1 during traveling of the combine harvester 1 on the turning route 55 and the position of the field outline 50 satisfy the predetermined positional relationship with regard to the created autonomous travel route 53 (Step S3). When it is determined that the predetermined positional relationship is satisfied (Step S3: Yes), the route determination unit 48 confirms the autonomous travel route 53, and the travel control unit 35 may execute autonomous reaping travel along the autonomous travel route 53 (Step S4).

Conversely, when it is determines that the predetermined positional relationship is not satisfied (Step S3: No), the route determination unit 48 recreates the autonomous travel route 53 so as to satisfy the predetermined positional relationship (Step S5). Then, the route determination unit 48 confirms the recreated autonomous travel route 53, and the travel control unit 35 may execute the autonomous reaping travel along the recreated autonomous travel route 53 (Step S4).

As described above, according to the present embodiment, the combine harvester 1 is a work vehicle that performs autonomous travel in the field and includes the control device 30 and the portable terminal 40, and the portable terminal 40 includes the terminal-side control device 41. The terminal-side control device 41 functions as the route creation unit 47 and the route determination unit 48. The route creation unit 47 creates, as the autonomous travel route 53 for the combine harvester 1 to autonomously travel in the field, the autonomous travel route 53 including the plurality of work routes 54 for performing work in the unworked region 51 of the field and the turning route 55 connecting the two work routes 54. The route determination unit 48 determines whether the position of the combine harvester 1 during traveling of the combine harvester 1 on the turning route 55 and the position of the field outline 50 satisfy the predetermined positional relationship with regard to the autonomous travel route 53 created by the route creation unit 47, confirms the autonomous travel route 53 when it is determined that the predetermined positional relationship is satisfied and, recreates the autonomous travel route 53 to satisfy the predetermined positional relationship when it is determined that the predetermined positional relationship is not satisfied.

In other words, a route creation method for creating the autonomous travel route 53 for a work vehicle such as the combine harvester 1 to autonomously travel in the field according to the present invention includes a route creation step of creating the autonomous travel route 53 including the plurality of work routes 54 for the combine harvester 1 to work in the unworked region 51 of the field and the turning route 55 connecting the two work routes 54 and a route determination step of determining whether the position of the combine harvester 1 during traveling of the combine harvester 1 on the turning route 55 and the position of the field outline 50 satisfy the predetermined positional relationship with regard to the autonomous travel route 53 created in the route creation step, confirming the autonomous travel route 53 when it is determined that the predetermined positional relationship is satisfied and, recreating the autonomous travel route 53 to satisfy the predetermined positional relationship when it is determined that the predetermined positional relationship is not satisfied.

Thus, the combine harvester 1 may create the autonomous travel route 53 to include the turning route 55 having the predetermined positional relationship at the stage of automatically creating the autonomous travel route 53, and thus it is possible to create the turning route 55 in which the combine harvester 1 does not move out of the field or enter the unworked region 51. Therefore, during the actual autonomous travel of the combine harvester 1, it is possible to prevent correction of the autonomous travel route 53 or stop of the vehicle due to an unexpected situation, and thus it is possible to improve work efficiency.

Further, according to the present embodiment, when the combine harvester 1 is located within the range of the autonomous travel enabling region 57 set inside the field outline 50, the route determination unit 48 determines that the predetermined positional relationship is satisfied.

Thus, the combine harvester 1 may create the autonomous travel route 53 to include the turning route 55 that ensures safety at the stage of automatically creating the autonomous travel route 53.

Further, according to the present embodiment, when it is determined that the predetermined positional relationship is not satisfied, the route determination unit 48 enables selection whether to recreate the autonomous travel route 53 to satisfy the predetermined positional relationship or to further perform the outer-periphery reaping travel in the unworked region 51 before confirming the autonomous travel route 53 in accordance with the predetermined selection operation.

This allows the operator of the combine harvester 1 to select the operation mode of the combine harvester 1 in accordance with his/her intention when the automatically created turning route 55 does not satisfy the predetermined positional relationship.

Further, according to the present embodiment, when the route creation permission region 58 for permitting creation of the work route 54 is set inside the field outline 50, the route creation unit 47 creates the autonomous travel route 53 such that the work route 54 is provided within the range of the route creation permission region 58. When it is determined that the predetermined positional relationship is not satisfied, the route determination unit 48 enables selection whether to shift the route creation permission region 58 further to the inner side of the field in accordance with the predetermined selection operation.

Thus, when the automatically created turning route 55 does not satisfy the predetermined positional relationship, the operator of the combine harvester 1 may set the route creation permission region 58, which is the range of the work route 54 for performing the autonomous reaping travel, in accordance with the intention.

Furthermore, according to the present embodiment, the route creation unit 47 creates the autonomous travel route 53 for a harvesting machine such as the combine harvester 1 as the work vehicle to include the corner turning route as the turning route 55 at the position located in the corner of the unworked region 51, and the route determination unit 48 determines whether the position of the combine harvester 1 during traveling of the combine harvester 1 on the corner turning route and the position of the field outline 50 satisfy the predetermined positional relationship and, when it is determined that the predetermined positional relationship is not satisfied, creates the inclined route 56 that is a reaping route for reaping at the corner of the unworked region 51 corresponding to the corner turning route before traveling on the corner turning route.

Thus, the combine harvester 1 creates the reaping route for reaping at the corner of the unworked region 51 corresponding to the corner turning route at the stage of automatically creating the autonomous travel route 53, and thus may create the turning route 55 that prevents the combine harvester 1 from moving out of the field or entering the unworked region 51 without performing further outer-periphery reaping travel. Therefore, during the actual autonomous travel of the combine harvester 1, it is possible to prevent correction of the autonomous travel route 53 or stop of the vehicle due to an unexpected situation, and thus it is possible to improve work efficiency.

Further, according to the present embodiment, the route determination unit 48 sets at least one of the angle and the number of the reaping routes such that the position of the combine harvester 1 traveling on the corner turning route satisfies the predetermined positional relationship.

This allows the combine harvester 1 to create the turning route 55 to satisfy the predetermined positional relationship and improve work efficiency.

Further, according to the present embodiment, the route determination unit 48 enables setting of the number of reaping routes in accordance with the predetermined setting operation and sets the route creation permission region 58 for permitting creation of the work route 54 inside the field outline 50 in accordance with the set number.

This allows the combine harvester 1 to set the number of reaping routes in the turning route 55 in accordance with the intention of the operator and thus set the route creation permission region 58 in accordance with the intention of the operator.

Further, according to the present embodiment, the route determination unit 48 enables setting of the route creation permission region 58 for permitting creation of the work route 54 inside the field outline 50 in accordance with the predetermined setting operation and sets the number of the reaping routes in accordance with the set route creation permission region 58.

This allows the combine harvester 1 to set the route creation permission region 58 in accordance with the intention of the operator and thus set the number of reaping routes in the turning route 55 in accordance with the intention of the operator.

Next, as another embodiment, an example in which the turning radius of the combine harvester 1 during autonomous travel may be set will be described.

In the combine harvester 1, the turning radius of the turning route 55 in the autonomous travel route 53 for performing autonomous reaping travel is previously set to a predetermined recommendation value. When creating the autonomous travel route 53 for circling reaping, the route creation unit 47 usually creates the turning route 55 to make the a turn with the turning radius of the recommendation value. Furthermore, before the autonomous reaping travel, the combine harvester 1 performs the outer-periphery reaping travel of a predetermined number of steps (the number of circling) along the outer peripheral shape of the field to form the headland of the worked region 52 and then the route creation unit 47 creates the plurality of work routes 54 in the unworked region 51 and creates the turning route 55 connecting the two work routes 54 in the worked region 52.

However, as the turning radius of the recommendation value is large with respect to the headland width of the worked region 52 (as the headland width of the worked region 52 is small with respect to the turning radius of the recommendation value), as illustrated in FIG. 10(1), the combine harvester 1 may move out of the range of the field outline 50 or the autonomous travel enabling region 57 when traveling on the turning route 55. In the example described according to the above embodiment, when the position of the combine harvester 1 does not satisfy the predetermined positional relationship, the route determination unit 48 changes the turning method of the turning route 55 from the single-α turn to the multi-α turn to recreate the autonomous travel route 53.

On the other hand, according to another embodiment, when the route creation unit 47 creates the autonomous travel route 53, as illustrated in FIG. 10(2), the turning radius of the single-α turn is changed to be smaller than the recommendation value so that the turning route 55 is created such that the combine harvester 1 does not move out of the range of the field outline 50 or the autonomous travel enabling region 57 during traveling on the turning route 55. Moreover, according to another embodiment, when the route determination unit 48 recreates the autonomous travel route 53, the turning radius of the single-α turn may be changed to be smaller than the recommendation value.

In the combine harvester 1 according to the above-described embodiment and the like, the route creation permission region 58 is calculated based on the headland width, which is calculated based on the turning radius of the recommendation value, and the autonomous travel route 53 is created while creating the turning route 55 with the turning radius of the recommendation value for the unworked region 51 within the range of the route creation permission region 58. On the other hand, according to another embodiment, when the adjustment of the turning radius is allowed at the time of creating the autonomous travel route 53, the headland is formed with the designated headland width, which is designated regardless of the recommendation value of the turning radius, and the autonomous travel route 53 is created while adjusting the turning radius of the turning route 55 for the remaining unworked region 51. That is, according to another embodiment, the route creation permission region 58 is formed in accordance with the adjustment of the turning radius.

For example, when it is determined that the combine harvester 1 moves out of the range of the field outline 50 or the autonomous travel enabling region 57 on the turning route 55 when the turning route 55 of the single-α turn is created with the turning radius of the recommendation value, the route creation unit 47 first adjusts the turning radius to be smaller so as to fall within the range based on the headland width and the machine body length and creates the turning route 55 of the single-α turn.

In a case where the plurality of turning routes 55 is created for the plurality of work routes 54 of the autonomous travel route 53, the route creation unit 47 may determine whether to move out of the above-described range or adjust the turning radius for each of the turning routes 55. Therefore, when creating the autonomous travel route 53 for circling reaping, the route creation unit 47 determines whether to move out of the above-described range or adjusts the turning radius not only for the turning route 55 for circling on the outermost periphery (first circling) among the plurality of circling of the autonomous travel route 53, but also for the turning routes 55 for the second and subsequent circling. Furthermore, when it is determined that the turning route 55 for predetermined circling falls outside the above-described range with the turning radius of the recommendation value, the route creation unit 47 may omit the determination as to whether to fall outside the above-described range or the adjustment of the turning radius for the turning route 55 for circling on the inner side.

Furthermore, in the combine harvester 1, the minimum turning radius is previously set as the allowable minimum value of the turning radius to be adjusted so that the route creation unit 47 may adjust the turning radius to be small within the range up to the minimum turning radius. When it is determined that the combine harvester 1 moves out of the above-described range on the turning route 55 even though the turning radius is adjusted to be small to the minimum turning radius, the route creation unit 47 does not create the autonomous travel route 53 and may notify that the autonomous travel route 53 cannot be created or that the outer-periphery reaping travel is further performed in the unworked region 51 via the display unit 44.

Figure 11:
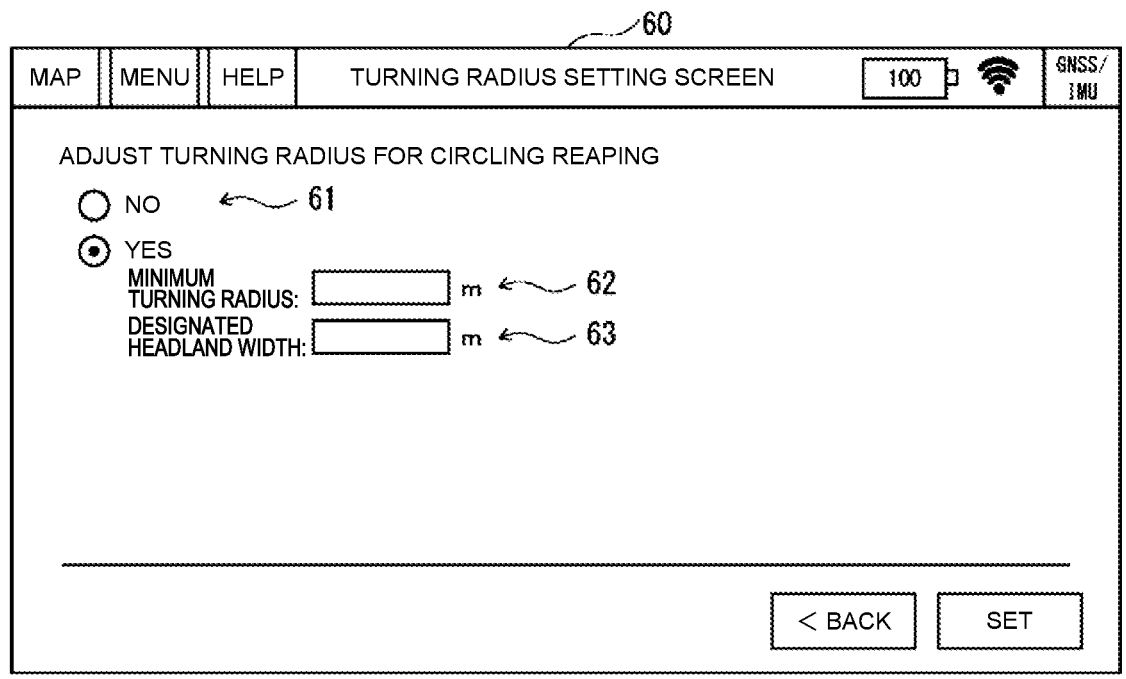
FIG. 11 is a plan view illustrating an example of a turning radius setting screen for adjusting the turning radius of the turning route in the combine harvester according to another embodiment of the present invention.

In the combine harvester 1, as illustrated in FIG. 11, the display unit 44 displays a turning radius setting screen 60 that enables setting of the turning radius of the turning route 55 for circling reaping. The turning radius setting screen 60 includes a selection item 61 for selecting whether to adjust the turning radius when the autonomous travel route 53 is created. Before the formation of the headland with the headland width based on the turning radius of the recommendation value is completed, for example, before the outer-periphery reaping travel is started, or while the outer-periphery reaping travel is executed, the combine harvester 1 may display the turning radius setting screen 60 to prompt the operator to select whether to adjust the turning radius. Alternatively, the combine harvester 1 may allow the selection, on the turning radius setting screen 60, of any one of an option to set the headland width enabling safe turn (an option to set the turning radius of the recommendation value) and an option to narrow the headland width so as to shift to autonomous reaping travel more quickly (an option to adjust the turning radius).

Further, the turning radius setting screen 60 includes a turning radius input item 62 to set the minimum turning radius as the allowable minimum value of the turning radius to be adjusted. Further, in the combine harvester 1, the lower limit value of the turning radius, with which turning is physically possible, is previously set, and therefore, the turning radius input item 62 enables setting of the minimum turning radius within the range equal to or more than the lower limit value of the turning radius and less than the recommendation value.

The turning radius setting screen 60 includes a headland width input item 63 for setting the designated headland width (or the designated number of steps for the outer-periphery reaping travel) to be designated for the headland in a case where the adjustment of the turning radius is allowed when the autonomous travel route 53 is created. Further, in the combine harvester 1, the lower limit value of the headland width of the headland (or the lower limit value of the steps (circling) of the outer-periphery reaping travel) is set previously, and therefore the headland width input item 63 enables setting of the designated headland width within the range equal to or more than the lower limit value of the turning radius. Further, the designated headland width (the route creation permission region 58) may be set from the multiplication result of the number of steps (the number of circling) of the outer-periphery reaping travel, e.g., the designated number of steps, and the reaping width of the machine body. Alternatively, the designated headland width (the route creation permission region 58) may be set by subtracting a recommended lap amount (e.g., 10 cm) of the reaping width for each step from the multiplication result of the number of steps (the number of circling) of the outer-periphery reaping travel and the reaping width of the machine body.

Alternatively, the turning radius setting screen 60 may omit the setting of the minimum turning radius in the turning radius input item 62 and allow only the setting of the designated headland width in the headland width input item 63, and the combine harvester 1 may calculate the minimum turning radius based on the set designated headland width. Alternatively, the turning radius setting screen 60 may omit the setting of the designated headland width in the headland width input item 63 and allow only the minimum turning radius in the turning radius input item 62, and the combine harvester 1 may calculate the designated headland width based on the set minimum turning radius.

Furthermore, in the above-described example according to another embodiment, the route creation unit 47 selects whether to adjust the turning radius when creating the autonomous travel route 53 according to the setting of the selection item 61 of the turning radius setting screen 60, but the present invention is not limited to this example.

According to another example, the route creation unit 47 may determine whether the adjustment of the turning radius is needed for the route creation permission region 58 (the worked region 52 and the unworked region 51) that is assumed when the headland is formed with the recommendation value or the designated headland width (or the designated number of steps) and notify the determination result via the display unit 44. For example, the route creation unit 47 first creates the autonomous travel route 53 while creating the turning route 55 of the single-α turn with the turning radius of the recommendation value with respect to the route creation permission region 58 (the worked region 52 and the unworked region 51) with the designated headland width (or the designated number of steps). At this time, when it is determined that the combine harvester 1 moves out of the range of the field outline 50 or the autonomous travel enabling region 57 on the turning route 55 and when it is determined that the combine harvester 1 falls within the range by creating the turning route 55 with the turning radius adjusted to be small, the route creation unit 47 notifies that the autonomous reaping travel is executable with the designated headland width (or the designated number of steps) by adjusting the turning radius via the display unit 44.

Furthermore, the route creation unit 47 may display a selection screen (not illustrated) on the display unit 44 and prompt the operator to select whether to make the headland width (or the number of steps) larger than the designated headland width (or the designated number of steps) by further performing the outer-periphery reaping travel in the unworked region 51 without adjusting the turning radius or to execute the autonomous reaping travel with the designated headland width (or the designated number of steps) by adjusting the turning radius. Alternatively, the route creation unit 47 may display a selection screen (not illustrated) on the display unit 44 and prompt the operator to select whether to set the headland width that allows safe turn with the turning radius of the recommendation value or to narrow the headland width by adjusting the turning radius in order to shift to the autonomous reaping travel more quickly.

Furthermore, the combine harvester 1 may calculate the route creation permission region 58 (a first route creation permission region 58a) based on the headland width calculated based on the turning radius of the recommendation value, but according to another embodiment, may calculate the route creation permission region 58 (a second route creation permission region 58b) based on the headland width calculated based on the turning radius adjusted to be smaller than the recommendation value or the designated headland width (or the designated number of steps).

Therefore, according to another embodiment, the screen may simultaneously display the first route creation permission region 58a based on the turning radius of the recommendation value and the second route creation permission region 58b based on the adjusted turning radius so that the operator may visually determine whether to adjust the turning radius.

Figure 12:
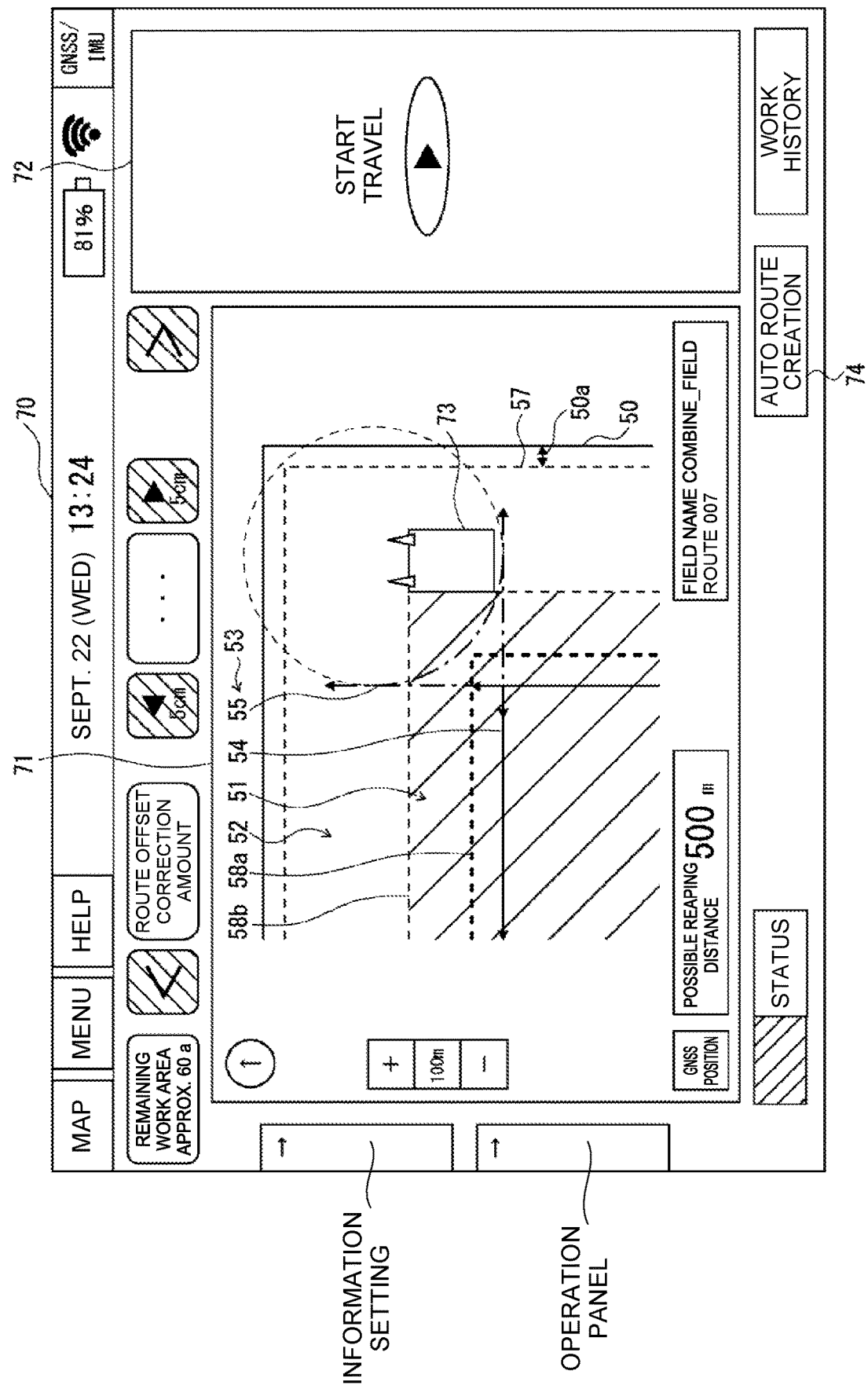
FIG. 12 is a plan view illustrating an example of a work screen in the combine harvester according to another embodiment of the present invention.

For example, as illustrated in FIG. 12, when the autonomous travel mode is set, the combine harvester 1 displays a work screen 70 for performing the autonomous travel in the work target field on the display unit 44 based on the field information of the field selected by the field selection unit 46. The work screen 70 displays at least a map field 71 and a travel start button 72 in an operable manner. The map field 71 displays the field outline 50 and the autonomous travel enabling region 57 and also displays an own vehicle mark 73 of the combine harvester 1 at the own vehicle position of the combine harvester 1 determined by the positioning unit 28. Further, the map field 71 simultaneously displays the first route creation permission region 58a and the second route creation permission region 58b.

Furthermore, the route creation unit 47 may create the autonomous travel route 53 while creating the turning route 55 of the single-α turn with the turning radius of the recommendation value for the first route creation permission region 58a and display the autonomous travel route 53 in the map field 71. Alternatively, the autonomous travel route 53 may be displayed when the travel start button 72 or an auto route creation button 74 is operated. Further, the route creation unit 47 may create the autonomous travel route 53 for the second route creation permission region 58b and display the autonomous travel route 53 in the map field 71. Here, in the map field 71, the autonomous travel route 53 for the first route creation permission region 58a and the autonomous travel route 53 for the second route creation permission region 58b may be simultaneously displayed, or any one of the autonomous travel routes 53 may be switched and displayed in accordance with a predetermined switching operation.

The combine harvester 1 starts the autonomous reaping travel in response to the operation of the travel start button 72, but according to another embodiment, may display a selection screen (not illustrated) on the display unit 44 and prompt the operator to select whether to adjust the turning radius at the timing when the travel start button 72 is operated. Furthermore, when it is determined that the turning radius needs to be adjusted for the selected route creation permission region 58, the route creation unit 47 may notify it via the display unit 44 at the timing when the travel start button 72 is operated. The combine harvester 1 creates the autonomous travel route 53 including the work route 54 within the range of the route creation permission region 58 in response to the operation of the auto route creation button 74, but may display, on the display unit 44, a selection screen (not illustrated) for selecting whether to adjust the turning radius or the notification indicating that the turning radius needs to be adjusted at the timing when the auto route creation button 74 is operated instead of the operation of the travel start button 72 described above.

Alternatively, the work screen 70 may enable selection of the first route creation permission region 58a and the second route creation permission region 58b so that the turning radius may be maintained at the recommendation value when the first route creation permission region 58a is selected while the turning radius may be adjusted when the second route creation permission region 58*b* is selected.

Alternatively, the map field 71 may first display the first route creation permission region 58*a* based on the turning radius of the recommendation value and, every time the turning radius is adjusted, may be updated to display the second route creation permission region 58*b* based on the adjusted turning radius.

Further, according to another example, while the combine harvester 1 is performing the outer-periphery reaping travel, the turning radius of the turning route 55 needed for the autonomous reaping travel in the route creation permission region 58 (the worked region 52 and the unworked region 51) at the present time, i.e., the turning radius needed at the present time, may be calculated in accordance with the number of steps (the number of circling) of the outer-periphery reaping travel elapsed at the present time or the headland width of the formed headland of the worked region 52, and may be displayed via the display unit 44.

For example, the combine harvester 1 displays the turning radius needed at the present time on the work screen 70 displayed on the display unit 44. At this time, the work screen 70 may display the turning radius of the recommendation value, the set minimum turning radius, the lower limit value of the turning radius, and the like, at the same time as the turning radius needed at the current time. The operator refers to the turning radius needed at the present time and thus may determine the timing at which the outer-periphery reaping travel is finished and the autonomous reaping travel is started.

Furthermore, when the turning radius is adjusted to be smaller than the recommendation value, the route creation unit 47 may set, for the turning route 55 created with the turning radius, the traveling speed that is lower than that of the turning route 55 created with the turning radius of the recommendation value. At this time, the combine harvester 1 may previously prepare the map indicating the relationship among a parameter such as the storage quantity of grains in the grain tank 24, the remaining amount of fuel in a fuel tank (not illustrated), and a field condition (e.g., the water amount state of the field such as whether the field is a dry field or a wet field), the turning radius, and the traveling speed and may set the traveling speed based on the map. For example, the traveling speed is set to be lower as the storage quantity of grains or the remaining amount of fuel is larger and the turning radius is smaller.

Furthermore, according to a further embodiment, when creating the turning route 55 connecting the one work route 54 and the subsequent work route 54, as illustrated in FIGS. 10(1) and (2), the route creation unit 47 sets a turning circle 80 based on the turning radius in the field and creates the turning route 55 based on a predetermined arc of the turning circle 80, a tangent to the turning circle 80 on the extension of the one work route 54, and a tangent to the turning circle 80 on the extension of the subsequent work route 54. At this time, the tangent to the turning circle 80 may be set beyond the contact point of the turning circle 80.

Further, as illustrated in FIG. 13(1), when the turning route 55 created from the turning circle 80 based on the turning radius of the recommendation value moves out of the range of the field outline 50 or the autonomous travel enabling region 57, the route creation unit 47 may shift the position of the turning circle 80 so as to fall within the range of the field outline 50 or the autonomous travel enabling region 57 as illustrated in FIG. 13(2). At this time, the route creation unit 47 may shift the position of the turning circle 80 so as to maintain the tangent on the extension of the subsequent route. Further, the route creation unit 47 may maintain the turning radius of the turning circle 80, the position of which is to be shifted, at the recommendation value, or may adjust the turning radius to be smaller than the recommendation value.

When the shifted turning circle 80 does not maintain the tangent on the extension of the one work route 54, the route creation unit 47 sets the shifted turning circle 80 as a first turning circle 80*a*, adds a second turning circle 80*b* having a tangent on the extension of the one work route 54, and acquires a common tangent to the first turning circle 80*a* and the second turning circle 80*b*. Then, the route creation unit 47 creates the turning route 55 by using the predetermined arc of the first turning circle 80*a*, the predetermined arc of the second turning circle 80*b*, and the common tangent. Furthermore, the route creation unit 47 may maintain the turning radii of the first turning circle 80*a* and the second turning circle 80*b* at the recommendation values or may adjust the turning radii to be smaller than the recommendation values. Moreover, the route creation unit 47 may set the turning radii of the first turning circle 80*a* and the second turning circle 80*b* to be the same or may enable setting of the turning radii in accordance with an operation of the worker.

The route creation unit 47 may set the position of the second turning circle 80*b* so as to reduce the interference between the second turning circle 80*b* and the unworked region 51 and may set the positions of the first turning circle 80*a* and the second turning circle 80*b* so as to obtain the shortest turning route 55. Furthermore, when the route along the predetermined arc of the second turning circle 80*b* passes through the unworked region 51, the route creation unit 47 may create the turning route 55 so as to travel on the second turning circle 80*b* while reaping in the unworked region 51.

Figure 14:
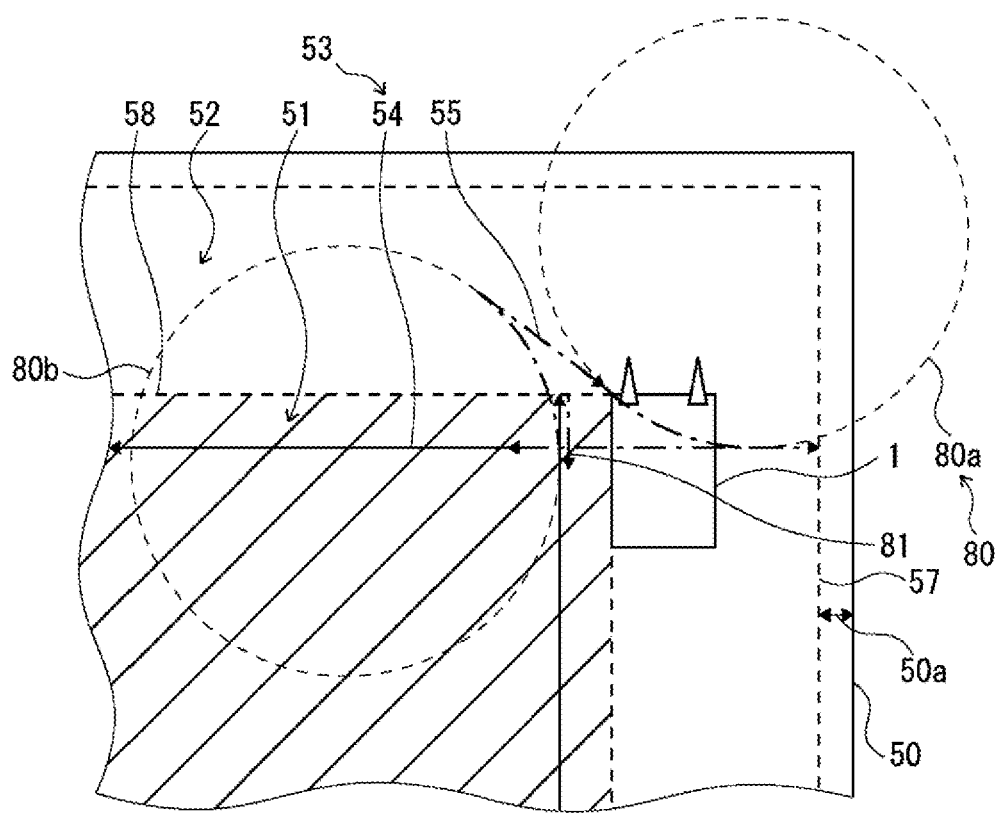
FIG. 14 is a plan view illustrating an example in which a turning circle of a turning route is shifted in the combine harvester according to a further embodiment of the present invention.

Further, in some positional relationships between the terminal end of the one work route 54 and the second turning circle 80*b*, the combine harvester 1 may not be able to travel forward from the one work route 54 to the second turning circle 80*b* in a smooth manner. Therefore, according to a further embodiment, as illustrated in FIG. 14, the route creation unit 47 creates a backward route 81 for backward travel along the one work route 54 after the forward travel on the one work route 54 to create the turning route 55 including the backward route 81. In FIG. 14, the backward route 81 is shifted from the one work route 54 in the illustration to make the backward route 81 easily viewable, but the backward route 81 is set along the work route 54.

Furthermore, the route creation unit 47 may create a forward route to move to the second turning circle 80*b* after the backward travel on the backward route 81 and may create the turning route 55 including the forward route in addition to the above-described backward route 81. Also in this case, when the route along the predetermined arc of the second turning circle 80*b* passes through the unworked region 51, the route creation unit 47 may create the turning route 55 so as to travel on the second turning circle 80*b* while reaping in the unworked region 51.

Further, according to another example, when the turning route 55 created from the turning circle 80 based on the turning radius of the recommendation value moves out of the range of the field outline 50 or the autonomous travel enabling region 57, the combine harvester 1 may enable selection whether to adjust the turning radius as in another embodiment or to add the turning circle 80 or the backward route 81 as in the further embodiment.

For example, the route creation unit 47 selects whether to adjust the turning radius or to add the backward route 81 in accordance with a parameter such as the storage quantity of grains in the grain tank 24, the remaining amount of fuel in a fuel tank (not illustrated), and a field condition (e.g., the water amount state of the field such as whether the field is a dry field or a wet field). Specifically, when the storage quantity of grains or the remaining amount of fuel is large (for example, when it is a predetermined threshold or more) or when the ground surface of the field is soft as a field condition, it is difficult to perform the turning travel with a small turning radius, and therefore, the route creation unit 47 may create the turning route 55 by adding the backward route 81.

Alternatively, the combine harvester 1 previously stores thresholds at a plurality of stages for the turning radius or the headland width and determines the turning radius or the headland width set in accordance with an operation of the worker with the threshold to determine which stage the turning radius or the headland width corresponds to. Further, the combine harvester 1 previously assigns, to each of the stages for the turning radius or the headland width, any of various creation patterns of the turning route 55, such as the creation pattern to adjust the turning radius as in another embodiment, the creation pattern to add the turning circle 80 as in the further embodiment, and the creation pattern to add the backward route 81. Then, the route creation unit 47 determines the creation pattern corresponding to the result of the threshold determination for the turning radius or the headland width and creates the turning route 55 by applying the creation pattern of the determination result.

Alternatively, the route creation unit 47 may display a selection screen (not illustrated) on the display unit 44 and prompt the operator to select which of the above-described various creation patterns is to be applied.

Then, the route creation unit 47 calculates and applies the turning radius and/or the headland width with which the turning route 55 may be created in the selected creation pattern.

Furthermore, in the example described according to above embodiment, the terminal-side control device 41 of the portable terminal 40 functions as the route creation unit 47 and the route determination unit 48; however, the present invention is not limited to this example, and the control device 30 of the combine harvester 1 or a server capable of communicating with the combine harvester 1 or the portable terminal 40 may be configured to function as the route creation unit 47 and the route determination unit 48.

In the example described according to the above embodiment, the combine harvester 1 is configured as a head-feeding combine harvester; however, the present invention is not limited to the above example, and the combine harvester 1 may be configured as an ordinary combine harvester.

Furthermore, in the example described according to the above embodiment, the work vehicle is configured as the combine harvester 1, but the present invention is not limited to this example. For example, the work vehicle according to the present invention may be configured as other agricultural machinery for harvesting crops or may be configured as work vehicles other than agricultural machinery.

It should be noted that the present invention may be modified as appropriate without departing from the spirit or concept of the invention that may be read from the claims and the entire specification, and a route creation method, a work vehicle, and an autonomous travel system that involve such modifications are also included in the technical concept of the present invention.

Supplementary Notes of Invention

A summary of the invention extracted from the above-described embodiment will be described below as supplementary notes. It should be noted that each configuration and processing function described in the supplementary notes below may be selected, omitted, and combined as appropriate.

<Supplementary Note 1>

A route creation method for creating an autonomous travel route for a work vehicle to autonomously travel in a field, the route creation method including:

a route creation step of creating the autonomous travel route including a plurality of work routes for the work vehicle to perform work in an unworked region of the field and a turning route connecting two of the work routes; and a route determination step of determining whether a position of the work vehicle during traveling of the work vehicle on the turning route and a position of a field outline satisfy a predetermined positional relationship with regard to the autonomous travel route created in the route creation step, confirming the autonomous travel route when it is determined that the predetermined positional relationship is satisfied, and recreating the autonomous travel route to satisfy the predetermined positional relationship when it is determined that the predetermined positional relationship is not satisfied.

<Supplementary Note 2>

The route creation method according to the supplementary note 1, wherein the route determination step determines that the predetermined positional relationship is satisfied when the work vehicle is located within a range of an autonomous travel enabling region set inside the field outline.

<Supplementary Note 3>

The route creation method according to the supplementary note 1 or 2, wherein, when it is determined that the predetermined positional relationship is not satisfied, the route determination step enables selection whether to recreate the autonomous travel route to satisfy the predetermined positional relationship or to further perform outer-periphery reaping travel in the unworked region before the autonomous travel route is confirmed, in accordance with a predetermined selection operation.

<Supplementary Note 4>

The route creation method according to any one of the supplementary notes 1 to 3, wherein when a route creation permission region for permitting creation of the work route is set inside the field outline, the route creation step creates the autonomous travel route such that the work route is provided within a range of the route creation permission region, and when it is determined that the predetermined positional relationship is not satisfied, the route determination step enables selection whether to shift the route creation permission region further to an inner side of the field, in accordance with a predetermined selection operation.

<Supplementary Note 5>

The route creation method according to any one of the supplementary notes 1 to 4, wherein the route creation step creates the autonomous travel route for a harvesting machine as the work vehicle to include a corner turning route as the turning route at a position located at a corner of the unworked region, and the route determination step determines whether a position of the work vehicle during traveling of the work vehicle on the corner turning route and a position of the field outline satisfy the predetermined positional relationship and, when it is determined that the predetermined positional relationship is not satisfied, creates a reaping route for reaping at the corner of the unworked region corresponding to the corner turning route before traveling on the corner turning route.

<Supplementary Note 6>

The route creation method according to the supplementary note 5, wherein the route determination step sets at least one of an angle and a number of the reaping routes such that the position of the work vehicle traveling on the corner turning route satisfies the predetermined positional relationship.

<Supplementary Note 7>

The route creation method according to the supplementary note 5, wherein the route determination step
  enables setting of a number of the reaping routes in accordance with a predetermined setting operation, and
  sets a route creation permission region for permitting creation of the work route inside the field outline in accordance with the set number.

<Supplementary Note 8>

The route creation method according to the supplementary note 5, wherein the route determination step
  enables setting of a route creation permission region for permitting creation of the work route inside the field outline in accordance with a predetermined setting operation, and
  sets a number of the reaping routes in accordance with the set route creation permission region.

<Supplementary Note 9>

The route creation method according to the supplementary note 1, wherein, when it is determined that the predetermined positional relationship is not satisfied, the route creation step enables adjustment of a turning radius of the turning route.

<Supplementary Note 10>

A work vehicle that autonomously travels in a field, the work vehicle including:
  a route creation unit that creates, as an autonomous travel route for the work vehicle to autonomously travel in the field, the autonomous travel route including a plurality of work routes for performing work in an unworked region of the field and a turning route connecting two of the work routes; and
  a route determination unit that determines whether a position of the work vehicle during traveling of the work vehicle on the turning route and a position of a field outline satisfy a predetermined positional relationship with regard to the autonomous travel route created by the route creation unit, confirms the autonomous travel route when it is determined that the predetermined positional relationship is satisfied, and recreates the autonomous travel route to satisfy the predetermined positional relationship when it is determined that the predetermined positional relationship is not satisfied.

<Supplementary Note 11>

The work vehicle according to the supplementary note 10, wherein the route determination unit determines that the predetermined positional relationship is satisfied when the work vehicle is located within a range of an autonomous travel enabling region set inside the field outline.

<Supplementary Note 12>

The work vehicle according to the supplementary note 10 or 11, wherein, when it is determined that the predetermined positional relationship is not satisfied, the route determination unit enables selection whether to recreate the autonomous travel route to satisfy the predetermined positional relationship or to further perform outer-periphery reaping travel in the unworked region before the autonomous travel route is confirmed, in accordance with a predetermined selection operation.

<Supplementary Note 13>

The work vehicle according to any one of the supplementary notes 10 to 12, wherein
  when a route creation permission region for permitting creation of the work route is set inside the field outline, the route creation unit creates the autonomous travel route such that the work route is provided within a range of the route creation permission region, and
  when it is determined that the predetermined positional relationship is not satisfied, the route determination unit enables selection whether to shift the route creation permission region further to an inner side of the field, in accordance with a predetermined selection operation.

<Supplementary Note 14>

The work vehicle according to any one of the supplementary notes 10 to 13, wherein
  the route creation unit creates the autonomous travel route for a harvesting machine as the work vehicle to include a corner turning route as the turning route at a position located at a corner of the unworked region, and
  the route determination unit determines whether a position of the work vehicle during traveling of the work vehicle on the corner turning route and a position of the field outline satisfy the predetermined positional relationship and, when it is determined that the predetermined positional relationship is not satisfied, creates a reaping route for reaping at the corner of the unworked region corresponding to the corner turning route before traveling on the corner turning route.

<Supplementary Note 15>

The work vehicle according to the supplementary note 14, wherein the route determination unit sets at least one of an angle and a number of the reaping routes such that the position of the work vehicle traveling on the corner turning route satisfies the predetermined positional relationship.

<Supplementary Note 16>

The work vehicle according to the supplementary note 14, wherein the route determination unit
  enables setting of a number of the reaping routes in accordance with a predetermined setting operation, and
  sets a route creation permission region for permitting creation of the work route inside the field outline in accordance with the set number.

<Supplementary Note 17>

The work vehicle according to the supplementary note 14, wherein the route determination unit
  enables setting of a route creation permission region for permitting creation of the work route inside the field outline in accordance with a predetermined setting operation, and
  sets a number of the reaping routes in accordance with the set route creation permission region.

<Supplementary Note 18>

The work vehicle according to the supplementary note 10, wherein, when it is determined that the predetermined positional relationship is not satisfied, the route creation unit enables adjustment of a turning radius of the turning route.

<Supplementary Note 19>

An autonomous travel system for a work vehicle to autonomously travel in a field, the autonomous travel system including:

a route creation unit that creates, as an autonomous travel route for the work vehicle to autonomously travel in the field, the autonomous travel route including a plurality of work routes for performing work in an unworked region of the field and a turning route connecting two of the work routes; and a route determination unit that determines whether a position of the work vehicle during traveling of the work vehicle on the turning route and a position of a field outline satisfy a predetermined positional relationship with regard to the autonomous travel route created by the route creation unit, confirms the autonomous travel route when it is determined that the predetermined positional relationship is satisfied, and recreates the autonomous travel route to satisfy the predetermined positional relationship when it is determined that the predetermined positional relationship is not satisfied.

<Supplementary Note 20>

The autonomous travel system according to the supplementary note 19, wherein the route determination unit determines that the predetermined positional relationship is satisfied when the work vehicle is located within a range of an autonomous travel enabling region set inside the field outline.

<Supplementary Note 21>

The autonomous travel system according to the supplementary note 19 or 20, wherein, when it is determined that the predetermined positional relationship is not satisfied, the route determination unit enables selection whether to recreate the autonomous travel route to satisfy the predetermined positional relationship or to further perform outer-periphery reaping travel in the unworked region before the autonomous travel route is confirmed, in accordance with a predetermined selection operation.

<Supplementary Note 22>

The autonomous travel system according to any one of the supplementary notes 19 to 21, wherein
when a route creation permission region for permitting creation of the work route is set inside the field outline, the route creation unit creates the autonomous travel route such that the work route is provided within a range of the route creation permission region, and
when it is determined that the predetermined positional relationship is not satisfied, the route determination unit enables selection whether to shift the route creation permission region further to an inner side of the field, in accordance with a predetermined selection operation.

<Supplementary Note 23>

The autonomous travel system according to any one of the supplementary notes 19 to 22, wherein
the route creation unit creates the autonomous travel route for a harvesting machine as the work vehicle to include a corner turning route as the turning route at a position located at a corner of the unworked region, and
the route determination unit determines whether a position of the work vehicle during traveling of the work vehicle on the corner turning route and a position of the field outline satisfy the predetermined positional relationship and, when it is determined that the predetermined positional relationship is not satisfied, creates a reaping route for reaping at the corner of the unworked region corresponding to the corner turning route before traveling on the corner turning route.

<Supplementary Note 24>

The autonomous travel system according to the supplementary note 23, wherein the route determination unit sets at least one of an angle and a number of the reaping routes such that the position of the work vehicle traveling on the corner turning route satisfies the predetermined positional relationship.

<Supplementary Note 25>

The autonomous travel system according to the supplementary note 23, wherein the route determination unit
enables setting of a number of the reaping routes in accordance with a predetermined setting operation, and
sets a route creation permission region for permitting creation of the work route inside the field outline in accordance with the set number.

<Supplementary Note 26>

The autonomous travel system according to the supplementary note 23, wherein the route determination unit
enables setting of a route creation permission region for permitting creation of the work route inside the field outline in accordance with a predetermined setting operation, and
sets a number of the reaping routes in accordance with the set route creation permission region.

<Supplementary Note 27>

The autonomous travel system according to the supplementary note 19, wherein, when it is determined that the predetermined positional relationship is not satisfied, the route creation unit enables adjustment of a turning radius of the turning route.

REFERENCE SIGNS LIST

1 Combine harvester (work vehicle)
2 Traveling part
3 Reaping part
30 Control device
35 Travel control unit
40 Portable terminal
41 Terminal-side control device
44 Display unit
46 Field selection unit
47 Route creation unit
48 Route determination unit
50 Field outline
51 Unworked region
52 Worked region
53 Autonomous travel route
54 Work route
55 Turning route
56 Inclined route
57 Autonomous travel enabling region
58 Route creation permission region

The invention claimed is:

1. A route creation method for creating an autonomous travel route for a work vehicle to autonomously travel in a field, the route creation method comprising:
a route creation step of creating the autonomous travel route for a harvesting machine as the work vehicle to include a plurality of work routes for the work vehicle to perform work in an unworked region of the field and a turning route connecting two of the work routes, wherein the turning route comprises a corner turning route located at a corner of the unworked region; and
a route determination step of determining whether a position of the work vehicle during traveling of the work vehicle on the turning route that includes the corner turning route and a position of a field outline satisfy a predetermined positional relationship with regard to the autonomous travel route created in the route creation step, and confirming the autonomous travel route when it is determined that the predetermined positional relationship is satisfied, and recreating the autonomous travel route to satisfy the predetermined positional relationship when it is determined that the predetermined positional relationship is not satisfied, wherein the recreated autonomous travel route comprises at least one reaping route for reaping at the corner of the unworked region on the corner turning route, the at least one reaping route being generated prior to travel on the corner turning route.

2. The route creation method according to claim 1, wherein the route determination step determines that the predetermined positional relationship is satisfied when the work vehicle is located within a range of an autonomous travel enabling region set inside the field outline.

3. The route creation method according to claim 1, wherein, when it is determined that the predetermined positional relationship is not satisfied, the route determination step enables selection whether to recreate the autonomous travel route to satisfy the predetermined positional relationship or to further perform outer-periphery reaping travel in the unworked region before the autonomous travel route is confirmed, in accordance with a predetermined selection operation.

4. The route creation method according to claim 1, wherein
when a route creation permission region for permitting creation of the work route is set inside the field outline, the route creation step creates the autonomous travel route such that the work route is provided within a range of the route creation permission region, and
when it is determined that the predetermined positional relationship is not satisfied, the route determination step enables selection whether to shift the route creation permission region further to an inner side of the field, in accordance with a predetermined selection operation.

5. The route creation method according to claim 1, wherein the route determination step sets at least one of an angle and the at least one reaping route to comprise a number of the reaping routes such that the position of the work vehicle traveling on the corner turning route satisfies the predetermined positional relationship.

6. The route creation method according to claim 1, wherein the route determination step
enables setting of the at least one reaping route to comprise a number of the reaping routes in accordance with a predetermined setting operation, and
sets a route creation permission region for permitting creation of the work route inside the field outline in accordance with the set number.

7. The route creation method according to claim 1, wherein the route determination step
enables setting of a route creation permission region for permitting creation of the work route inside the field outline in accordance with a predetermined setting operation, and
sets the at least one reaping route to comprise a number of the reaping routes in accordance with the set route creation permission region.

8. The route creation method according to claim 1, wherein, when it is determined that the predetermined positional relationship is not satisfied, the route creation step enables adjustment of a turning radius of the turning route.

9. A work vehicle that autonomously travels in a field, the work vehicle comprising:
a route creation unit that creates, as an autonomous travel route for the work vehicle to autonomously travel in the field, the autonomous travel route for a harvesting machine as the work vehicle to include a plurality of work routes for performing work in an unworked region of the field and a turning route connecting two of the work routes, wherein the turning route comprises a corner turning route located at a corner of the unworked region; and
a route determination unit that determines whether a position of the work vehicle during traveling of the work vehicle on the turning route that includes the corner turning route and a position of a field outline satisfy a predetermined positional relationship with regard to the autonomous travel route created by the route creation unit, and confirms the autonomous travel route when it is determined that the predetermined positional relationship is satisfied, and recreates the autonomous travel route to satisfy the predetermined positional relationship when it is determined that the predetermined positional relationship is not satisfied, wherein the recreated autonomous travel route comprises at least one reaping route for reaping at the corner of the unworked region on the corner turning route, the at least one reaping route being generated prior to travel on the corner turning route.

10. An autonomous travel system for a work vehicle to autonomously travel in a field, the autonomous travel system comprising:
a route creation unit that creates, as an autonomous travel route for the work vehicle to autonomously travel in the field, the autonomous travel route for a harvesting machine as the work vehicle to include a plurality of work routes for performing work in an unworked region of the field and a turning route connecting two of the work routes, wherein the turning route comprises a corner turning route located at a corner of the unworked region; and
a route determination unit that determines whether a position of the work vehicle during traveling of the work vehicle on the turning route that includes the corner turning route and a position of a field outline satisfy a predetermined positional relationship with regard to the autonomous travel route created by the route creation unit, and confirms the autonomous travel route when it is determined that the predetermined positional relationship is satisfied, and recreates the autonomous travel route to satisfy the predetermined positional relationship when it is determined that the predetermined positional relationship is not satisfied, wherein the recreated autonomous travel route comprises at least one reaping route for reaping at the corner of the unworked region on the corner turning route, the at least one reaping route being generated prior to travel on the corner turning route.

* * * * *